United States Patent
Gupta et al.

(10) Patent No.: US 9,202,047 B2
(45) Date of Patent: *Dec. 1, 2015

(54) SYSTEM, APPARATUS, AND METHOD FOR ADAPTIVE OBSERVATION OF MOBILE DEVICE BEHAVIOR

(71) Applicant: QUALCOMM Incorporated, San Diego, CA (US)

(72) Inventors: Rajarshi Gupta, Sunnyvale, CA (US); Sudha Anil Gathala, Santa Clara, CA (US); Soorgoli Ashok Halambi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 13/627,401

(22) Filed: Sep. 26, 2012

(65) Prior Publication Data
US 2013/0303154 A1 Nov. 14, 2013

Related U.S. Application Data

(60) Provisional application No. 61/646,590, filed on May 14, 2012, provisional application No. 61/683,274, filed on Aug. 15, 2012.

(51) Int. Cl.
*H04W 24/00* (2009.01)
*G06F 21/55* (2013.01)
(Continued)

(52) U.S. Cl.
CPC .......... *G06F 21/552* (2013.01); *G06F 11/1433* (2013.01); *G06F 11/1458* (2013.01);
(Continued)

(58) Field of Classification Search
CPC ..... G06F 21/552; G06F 21/554; G06F 21/56; G06F 11/3466; G06F 11/3082; G06F 11/3006; G06F 2201/86; G06F 11/3476; H04W 88/02; H04W 24/08; H04W 52/0251; H04W 12/12; H04W 52/0258; Y02B 60/165; H04L 63/1433
USPC .............................. 455/410–411, 422.1–425
See application file for complete search history.

(56) References Cited

U.S. PATENT DOCUMENTS

| 5,870,735 A | 2/1999 | Agrawal et al. |
| 6,532,541 B1 | 3/2003 | Chang et al. |

(Continued)

FOREIGN PATENT DOCUMENTS

| CN | 102591696 A | 7/2012 |
| EP | 1182552 A2 | 2/2002 |

(Continued)

OTHER PUBLICATIONS

Caruana, et al., "An Empirical Comparison of Supervised Learning Algorithms", ICML, 2006, 8 pgs.

(Continued)

*Primary Examiner* — Sharad Rampuria
(74) *Attorney, Agent, or Firm* — Nicholas A. Cole

(57) ABSTRACT

Methods, devices and systems for detecting suspicious or performance-degrading mobile device behaviors intelligently, dynamically, and/or adaptively determine computing device behaviors that are to be observed, the number of behaviors that are to be observed, and the level of detail or granularity at which the mobile device behaviors are to be observed. The various aspects efficiently identify suspicious or performance-degrading mobile device behaviors without requiring an excessive amount of processing, memory, or energy resources. Various aspects may correct suspicious or performance-degrading mobile device behaviors. Various aspects may prevent identified suspicious or performance-degrading mobile device behaviors from degrading the performance and power utilization levels of a mobile device over time. Various aspects may restore an aging mobile device to its original performance and power utilization levels.

21 Claims, 16 Drawing Sheets

(51) Int. Cl.

| | | |
|---|---|---|
| *G06F 21/56* | (2013.01) | |
| *G06F 11/14* | (2006.01) | |
| *G06F 11/30* | (2006.01) | |
| *H04W 52/02* | (2009.01) | |
| *H04W 24/08* | (2009.01) | |
| *G06F 11/34* | (2006.01) | |
| *H04W 12/12* | (2009.01) | |
| *H04W 88/02* | (2009.01) | |
| *H04L 29/06* | (2006.01) | |

(52) U.S. Cl.
CPC ........ *G06F11/3006* (2013.01); *G06F 11/3082* (2013.01); *G06F 11/3466* (2013.01); *G06F 21/554* (2013.01); *G06F 21/56* (2013.01); *H04W 24/08* (2013.01); *H04W 52/0251* (2013.01); *H04W 52/0258* (2013.01); *G06F 11/3409* (2013.01); *G06F 11/3476* (2013.01); *G06F 2201/86* (2013.01); *H04L 63/1433* (2013.01); *H04W 12/12* (2013.01); *H04W 88/02* (2013.01); *Y02B 60/165* (2013.01)

(56) References Cited

U.S. PATENT DOCUMENTS

| | | | |
|---|---|---|---|
| 6,643,802 B1 | 11/2003 | Frost et al. | |
| 7,051,327 B1 | 5/2006 | Milius et al. | |
| 7,401,359 B2 | 7/2008 | Gartside et al. | |
| 7,559,053 B2 | 7/2009 | Krassovsky et al. | |
| 7,561,877 B2 | 7/2009 | Cassett et al. | |
| 7,571,478 B2 | 8/2009 | Munson et al. | |
| 7,600,014 B2 | 10/2009 | Russell et al. | |
| 7,650,317 B2 | 1/2010 | Basu et al. | |
| 7,676,573 B2 | 3/2010 | Herzog et al. | |
| 7,694,150 B1 | 4/2010 | Kirby | |
| 7,757,292 B1 | 7/2010 | Renert et al. | |
| 7,774,599 B2 | 8/2010 | Guo et al. | |
| 7,831,237 B2* | 11/2010 | Passarella et al. | 455/411 |
| 7,831,248 B2* | 11/2010 | Lee | 455/423 |
| 7,849,360 B2 | 12/2010 | Largman et al. | |
| 7,877,621 B2 | 1/2011 | Jacoby et al. | |
| 7,881,291 B2 | 2/2011 | Grah | |
| 7,890,443 B2 | 2/2011 | Zhang et al. | |
| 7,945,955 B2 | 5/2011 | Katkar | |
| 8,045,958 B2 | 10/2011 | Kahandaliyanage | |
| 8,087,067 B2 | 12/2011 | Mahaffey et al. | |
| 8,095,964 B1 | 1/2012 | Zhong et al. | |
| 8,161,548 B1 | 4/2012 | Wan | |
| 8,201,244 B2 | 6/2012 | Sun et al. | |
| 8,201,249 B2 | 6/2012 | McCallam | |
| 8,225,093 B2 | 7/2012 | Fok et al. | |
| 8,245,295 B2 | 8/2012 | Park et al. | |
| 8,245,315 B2 | 8/2012 | Cassett et al. | |
| 8,266,698 B1 | 9/2012 | Seshardi et al. | |
| 8,311,956 B2 | 11/2012 | Sen et al. | |
| 8,312,545 B2 | 11/2012 | Tuvell et al. | |
| 8,321,941 B2 | 11/2012 | Tuvell et al. | |
| 8,331,987 B2* | 12/2012 | Rosenblatt | 455/556.2 |
| 8,332,945 B2 | 12/2012 | Kim et al. | |
| 8,347,386 B2 | 1/2013 | Mahaffey et al. | |
| 8,397,301 B2 | 3/2013 | Hering et al. | |
| 8,443,439 B2 | 5/2013 | Lamastra et al. | |
| 8,458,809 B2 | 6/2013 | Adams et al. | |
| 8,516,584 B2 | 8/2013 | Moskovitch et al. | |
| 8,533,844 B2 | 9/2013 | Mahaffey et al. | |
| 8,554,912 B1* | 10/2013 | Reeves et al. | 709/225 |
| 8,694,744 B1 | 4/2014 | Raj et al. | |
| 8,701,192 B1 | 4/2014 | Glick et al. | |
| 8,762,298 B1 | 6/2014 | Ranjan et al. | |
| 8,763,127 B2 | 6/2014 | Yao et al. | |
| 8,775,333 B1 | 7/2014 | Zahn | |
| 2002/0099756 A1 | 7/2002 | Catthoor et al. | |
| 2004/0039924 A1 | 2/2004 | Baldwin et al. | |
| 2004/0068721 A1 | 4/2004 | O'Neill et al. | |
| 2004/0083366 A1 | 4/2004 | Nachenberg et al. | |
| 2004/0221163 A1 | 11/2004 | Jorgensen et al. | |
| 2005/0144480 A1 | 6/2005 | Kim et al. | |
| 2006/0026464 A1 | 2/2006 | Atkin et al. | |
| 2006/0085854 A1 | 4/2006 | Agrawal et al. | |
| 2006/0288209 A1 | 12/2006 | Vogler | |
| 2007/0006304 A1 | 1/2007 | Kramer et al. | |
| 2007/0136455 A1 | 6/2007 | Lee et al. | |
| 2007/0192866 A1 | 8/2007 | Sagoo et al. | |
| 2007/0199060 A1 | 8/2007 | Touboul | |
| 2007/0220327 A1 | 9/2007 | Ruscio et al. | |
| 2007/0283170 A1 | 12/2007 | Yami et al. | |
| 2007/0287387 A1 | 12/2007 | Keum et al. | |
| 2007/0294768 A1 | 12/2007 | Moskovitch et al. | |
| 2008/0016339 A1 | 1/2008 | Shukla | |
| 2008/0026464 A1 | 1/2008 | Borenstein et al. | |
| 2008/0046755 A1 | 2/2008 | Hayes | |
| 2008/0047009 A1 | 2/2008 | Overcash et al. | |
| 2008/0086773 A1 | 4/2008 | Tuvell et al. | |
| 2008/0109495 A1 | 5/2008 | Herberger et al. | |
| 2008/0126800 A1 | 5/2008 | Guo et al. | |
| 2008/0140821 A1 | 6/2008 | Tada | |
| 2008/0162686 A1 | 7/2008 | Kalaboukis et al. | |
| 2008/0163382 A1 | 7/2008 | Blue et al. | |
| 2008/0172746 A1* | 7/2008 | Lotter et al. | 726/26 |
| 2009/0019546 A1 | 1/2009 | Park et al. | |
| 2009/0199296 A1 | 8/2009 | Xie et al. | |
| 2009/0217078 A1 | 8/2009 | Cassett et al. | |
| 2009/0239531 A1 | 9/2009 | Andreasen et al. | |
| 2009/0287618 A1 | 11/2009 | Weinberger et al. | |
| 2009/0288080 A1 | 11/2009 | Partridge | |
| 2009/0288164 A1 | 11/2009 | Adelstein et al. | |
| 2009/0300765 A1 | 12/2009 | Moskovitch et al. | |
| 2009/0327168 A1 | 12/2009 | Weinberger et al. | |
| 2010/0011029 A1 | 1/2010 | Niemela | |
| 2010/0036786 A1 | 2/2010 | Pujara | |
| 2010/0082513 A1 | 4/2010 | Liu | |
| 2010/0105404 A1 | 4/2010 | Palanki et al. | |
| 2010/0107257 A1 | 4/2010 | Ollmann | |
| 2010/0128125 A1 | 5/2010 | Warzelhan | |
| 2010/0153371 A1 | 6/2010 | Singh | |
| 2010/0154032 A1 | 6/2010 | Ollmann | |
| 2010/0175135 A1 | 7/2010 | Kandek et al. | |
| 2010/0192201 A1 | 7/2010 | Shimoni et al. | |
| 2010/0241974 A1 | 9/2010 | Rubin et al. | |
| 2010/0251340 A1 | 9/2010 | Martin et al. | |
| 2010/0262693 A1 | 10/2010 | Stokes et al. | |
| 2010/0296496 A1 | 11/2010 | Sinha et al. | |
| 2010/0299292 A1 | 11/2010 | Collazo | |
| 2010/0313269 A1 | 12/2010 | Ye | |
| 2011/0004935 A1 | 1/2011 | Moffie et al. | |
| 2011/0013528 A1 | 1/2011 | Chen | |
| 2011/0023118 A1* | 1/2011 | Wright | 726/23 |
| 2011/0060948 A1 | 3/2011 | Beebe | |
| 2011/0105096 A1 | 5/2011 | Dods et al. | |
| 2011/0145920 A1 | 6/2011 | Mahaffey et al. | |
| 2011/0161452 A1 | 6/2011 | Poornachandran et al. | |
| 2011/0219449 A1* | 9/2011 | St. Neitzel et al. | 726/23 |
| 2011/0264764 A1 | 10/2011 | Kewalramani et al. | |
| 2011/0286437 A1 | 11/2011 | Austin et al. | |
| 2011/0302654 A1 | 12/2011 | Miettinen | |
| 2011/0302656 A1* | 12/2011 | El-Moussa | 726/24 |
| 2011/0307233 A1 | 12/2011 | Tseng et al. | |
| 2012/0016633 A1 | 1/2012 | Wittenstein et al. | |
| 2012/0051228 A1 | 3/2012 | Shuman et al. | |
| 2012/0060219 A1 | 3/2012 | Larsson et al. | |
| 2012/0096539 A1 | 4/2012 | Hu et al. | |
| 2012/0110174 A1 | 5/2012 | Wootton et al. | |
| 2012/0131674 A1 | 5/2012 | Wittenschlaeger | |
| 2012/0151062 A1 | 6/2012 | Gusev et al. | |
| 2012/0159633 A1 | 6/2012 | Grachev et al. | |
| 2012/0167162 A1 | 6/2012 | Raleigh et al. | |
| 2012/0167217 A1 | 6/2012 | McReynolds | |
| 2012/0167218 A1 | 6/2012 | Poornachandran et al. | |
| 2012/0180126 A1 | 7/2012 | Liu et al. | |
| 2012/0207046 A1* | 8/2012 | Di Pietro et al. | 370/252 |
| 2012/0210423 A1 | 8/2012 | Friedrichs et al. | |
| 2012/0227105 A1 | 9/2012 | Friedrichs et al. | |
| 2012/0233694 A1 | 9/2012 | Baliga et al. | |

(56) References Cited

U.S. PATENT DOCUMENTS

| | | |
|---|---|---|
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0203440 A1 | 8/2013 | Bilange et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz |
| 2014/0205099 A1 | 7/2014 | Christodorescu et al. |
| 2014/0237595 A1 | 8/2014 | Sridhara et al. |
| 2014/0245306 A1 | 8/2014 | Gathala |
| 2014/0279745 A1 | 9/2014 | Esponda et al. |
| 2014/0317734 A1* | 10/2014 | Valencia et al. ............... 726/22 |
| 2014/0337862 A1 | 11/2014 | Valencia et al. |
| 2015/0148109 A1 | 5/2015 | Gupta et al. |

FOREIGN PATENT DOCUMENTS

| | | |
|---|---|---|
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| TW | 200937198 A | 9/2009 |
| TW | 201239618 A | 10/2012 |
| WO | WO-2010048502 | 4/2010 |
| WO | 2010126416 A1 | 11/2010 |
| WO | 2011147580 A1 | 12/2011 |
| WO | 2013016692 | 1/2013 |
| WO | WO-2013080096 A1 | 6/2013 |
| WO | WO-2013173003 A2 | 11/2013 |
| WO | WO-2013173044 A2 | 11/2013 |

OTHER PUBLICATIONS

Caruana, et al., "An Empirical Evaluation of Supervised Learning in High Dimensions", ICML, 2008, 8 pgs.
International Search Report and Written Opinion—PCT/US2012/067726—ISA/EPO—Mar. 14, 2013.
Qin F., "System Support for Improving Software Dependability During Production Runs," Urbana, Illinois, 1998, pp. 1-116.
Shabtai A., et al., "Dectecting unknown malicious code by applying classification techniques on OpCode patterns," Security Informatics a Springer Open Journal, 2012, vol. 1 (1), pp. 1-22.
Wang Y-M., et al., "Strider: A Black-Box, State-based Approach to Change and Configuration Management and Support," 2003 LISA XVII—Oct. 26-31, 2003—San Diego, CA, pp. 165-178.
Co-pending U.S. Appl. No. 13/558,527, filed Jul. 26, 2012.

De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.
International Search Report and Written Opinion—PCT/US2013/078350—ISA/EPO—Oct. 29, 2014.
International Search Report and Written Opinion—PCT/US2013/078352—ISA/EPO—Nov. 10, 2014.
Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.
Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.
Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.
Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.
Gao J., et al., "Adaptive distributed intrusion detection using parametric model", Proceedings of the 2009 IEEE/WIC/ACM International Joint Conferences on Web Intelligence Agent Technologies (WI-IAT'09), vol. 1, Sep. 15, 2009, pp. 675-678, XP055107983, DOI: 10.1109/WI-IAT.2009.113 the whole document.
Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516-520, XP031200055, DOI: 10.1109/WI-IATW.2007.52 the whole document.
Kachirski O., et al., "Effective Intrusion Detection Using Windows Sensors in Wireless Ad Hoc Networks", IEEE Proceedings of the 36th Hawaii International Conference on System Sciences, 2002, 8 pages.
Kirda E., et al., "Behavior-Based Spyware Detection", 15th USENIX Security Symposium, 2002, pp. 273-288.
Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.
Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.
Shabtai A., et al., "a Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1]—paragraph [5.3.4].
Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.
Tabish S.M., "Malware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.
Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

(56) References Cited

OTHER PUBLICATIONS

Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.

Natesan P. et al., "Design of Two Stage Filter Using Enhanced Adaboost for Improving Attack Detection Rate in Network Intrusion Detection", International Journal of Computer Science and Information Technology & Security, vol. 2, No. 2, Apr. 2012, pp. 349-358, XP55086347, ISSN: 2249-955.

Shabta A., "Malware Detection on Mobile Devices", Proceedings of the 11th International Conference on Mobile Data Management, (MDM'2010), May 23, 2010, pp. 289-290, XP031692994, DOI: 10.1109/MDM.2010.28.

Sheen S., et al., "Network Intrusion Detection using Feature Selection and Decision tree classifier," TENCON—IEEE Region 10 Conference, 2008, pp. 1-4.

Kolter J.Z., et al., "Learning to Detect Malicious Executables in the Wild", ACM Knowl. Discovery and Data Mining (KDD), 2004, pp. 470-478.

Gavin McWilliams: "Malware detection methods for fixed and mobile networks", Centre for Secure Information Technologies—Queen's University Belfast, Jan. 23, 2013, pp. 1-21, XP017577639, [retrieved on Jan. 23, 2013] the whole document.

Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/Jarle Kittilsen.pdf [retrieved on Dec. 14, 2012] the whole document.

Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrived on Jun. 13, 2013] the whole document.

Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.

Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.

Taiwan Search Report—TW102114436—TIPO—Mar. 15, 2015.

Kaspersky Endpoint Security 8 for Smartphone Program Version 8.0, Updated on Feb. 8, 2012.

* cited by examiner

SYSTEM, APPARATUS, AND METHOD FOR ADAPTIVE OBSERVATION OF MOBILE DEVICE BEHAVIOR

RELATED APPLICATIONS

This application claims the benefit of priority to U.S. Provisional Patent Application No. 61/646,590 entitled "System, Apparatus and Method for Adaptive Observation of Mobile Device Behavior" filed May 14, 2012; and U.S. Provisional Application No. 61/683,274, entitled "System, Apparatus and Method for Adaptive Observation of Mobile Device Behavior" filed Aug. 15, 2012, the entire contents of both which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of observing mobile device behaviors over a period of time to recognize mobile device behaviors inconsistent with normal operation patterns, the method including dynamically determining in a processor which mobile device behaviors are to be observed, and adaptively observing the determined mobile device behaviors to identify a suspicious mobile device behavior from a limited set of observations. In an aspect, the method may include controlling an observation granularity of the adaptive observation. In a further aspect, dynamically determining which mobile device behaviors are to be observed may include observing mobile device behaviors over a period of time to recognize mobile device behaviors that are inconsistent with normal operation patterns, and identifying a limited set of behaviors associated with inconsistent operations as the mobile device behaviors to be observed.

In a further aspect, the operations of dynamically determining which mobile device behaviors are to be observed and controlling the observation granularity of the adaptive observation are accomplished within an observer daemon operating within a system kernel. In a further aspect, identifying a limited set of behaviors associated with inconsistent operations as the mobile device behaviors to be observed may include receiving behavior inputs from one or more of a high-level application, a system kernel, and a driver API after filtering by an adaptive filter, receiving a context input regarding operations of the mobile device, performing spatial correlations of the received behaviors and the received context, and generating a behavior vector. In a further aspect, identifying a limited set of behaviors associated with inconsistent operations as the mobile device behaviors to be observed further may include performing temporal correlations of the received behaviors and the received context input, in which generating a behavior vector may include generating a behavior vector based on a result of the spatial and temporal correlations. In a further aspect, identifying a limited set of behaviors associated with inconsistent operations as behaviors to be observed further may include storing the generated behavior vector in a secure memory.

Further aspects include a computing device that may include a processor, means for dynamically determining which mobile device behaviors are to be observed to identify behaviors inconsistent with normal operation patterns, and means for adaptively observing the determined mobile device behaviors to identify a suspicious mobile device behavior from a limited set of observations. In an aspect, the computing device may include means for controlling an observation granularity of the adaptive observation. In a further aspect, means for dynamically determining which mobile device behaviors are to be observed may include means for observing mobile device behaviors over a period of time to recognize mobile device behaviors that are inconsistent with normal operation patterns, and means for identifying a limited set of behaviors associated with inconsistent operations as the mobile device behaviors to be observed.

In a further aspect, the computing device may include observer daemon means, in which the observer daemon means may include means for dynamically determining which mobile device behaviors are to be observed and means for controlling the observation granularity of the adaptive observation within an observer daemon operating within a system kernel. In a further aspect, means for identifying a limited set of behaviors associated with inconsistent operations as the mobile device behaviors to be observed may include means for receiving behavior inputs from one or more of a high-level application, a system kernel, and a driver API after filtering by an adaptive filter, means for receiving a context input regarding operations of the mobile device, means for performing spatial correlations of the received behaviors and the received context, and means for generating a behavior vector. In a further aspect, means for identifying a limited set of behaviors associated with inconsistent operations as the mobile device behaviors to be observed further may include means for performing temporal correlations of the received behaviors and the received context input, in which means for generating a behavior vector may include means for generating a behavior vector based on a result of the spatial and temporal correlations. In a further aspect, means for identifying a limited set of behaviors associated with inconsistent operations as behaviors to be observed further may include means for storing the generated behavior vector in a secure memory.

Further aspects include a computing device that includes a processor configured with processor-executable instructions to perform operations including dynamically determining which mobile device behaviors are to be observed to identify behaviors inconsistent with normal operation patterns, and adaptively observing the determined mobile device behaviors to identify a suspicious mobile device behavior from a limited set of observations. In an aspect, the processor is configured with processor-executable instructions to perform operations further including controlling an observation granularity of the adaptive observation.

In a further aspect, the processor is configured with processor-executable instructions such that dynamically determining which mobile device behaviors are to be observed may include observing mobile device behaviors over a period of time to recognize mobile device behaviors that are inconsistent with normal operation patterns, and identifying a limited set of behaviors associated with inconsistent operations as the mobile device behaviors to be observed. In a further aspect, the processor is configured with processor-executable instructions such that the operations of dynamically determining which mobile device behaviors are to be observed and controlling the observation granularity of the adaptive observation are accomplished within an observer daemon operating within a system kernel. In a further aspect, the processor is configured with processor-executable instructions such that identifying a limited set of behaviors associated with inconsistent operations as the mobile device behaviors to be observed may include receiving behavior inputs from one or more of a high-level application, a system kernel, and a driver API after filtering by an adaptive filter, receiving a context input regarding operations of the mobile device, performing spatial correlations of the received behaviors and the received context, and generating a behavior vector.

In a further aspect, the processor is configured with processor-executable instructions such that identifying a limited set of behaviors associated with inconsistent operations as the mobile device behaviors to be observed further may include performing temporal correlations of the received behaviors and the received context input, and in which the processor is configured with processor-executable instructions such that generating a behavior vector may include generating a behavior vector based on a result of the spatial and temporal correlations. In a further aspect, the processor is configured with processor-executable instructions such that identifying a limited set of behaviors associated with inconsistent operations as behaviors to be observed further may include storing the generated behavior vector in a secure memory.

Further aspects include a non-transitory server-readable storage medium having stored thereon processor-executable instructions configured to cause a computing device to perform operations that may include dynamically determining which mobile device behaviors are to be observed to recognize mobile device behaviors inconsistent with normal operation patterns, and adaptively observing the determined mobile device behaviors to identify a suspicious mobile device behavior from a limited set of observations. In an aspect, the stored processor-executable instructions may be configured to cause a processor of a mobile device to perform operations further including controlling an observation granularity of the adaptive observation.

In a further aspect, dynamically determining which mobile device behaviors are to be observed may include observing mobile device behaviors over a period of time to recognize mobile device behaviors that are inconsistent with normal operation patterns, and identifying a limited set of behaviors associated with inconsistent operations as the mobile device behaviors to be observed. In a further aspect, operations of dynamically determining which mobile device behaviors are to be observed and controlling the observation granularity of the adaptive observation are accomplished within an observer daemon operating within a system kernel. In a further aspect, identifying a limited set of behaviors associated with inconsistent operations as the mobile device behaviors to be observed may include receiving behavior inputs from one or more of a high-level application, a system kernel, and a driver API after filtering by an adaptive filter, receiving a context input regarding operations of the mobile device, performing spatial correlations of the received behaviors and the received context, and generating a behavior vector.

In a further aspect, identifying a limited set of behaviors associated with inconsistent operations as the mobile device behaviors to be observed further may include performing temporal correlations of the received behaviors and the received context input, in which generating a behavior vector may include generating a behavior vector based on a result of the spatial and temporal correlations. In a further aspect, identifying a limited set of behaviors associated with inconsistent operations as behaviors to be observed further may include storing the generated behavior vector in a secure memory.

The various aspects also include methods of performing on a mobile device processor real-time behavior analysis of mobile device behaviors to generate coarse observations, identifying suspicious behavior from the coarse observations, dynamically determining the mobile device behaviors that require further observation in greater detail, dynamically determining a level of detail required for the further observation, performing finer observations based on the determined level of detail required for the further observation, and identifying suspicious behavior from the finer observations. In an aspect, the method may include performing mobile devices operations to correct the identified suspicious behavior. In a further aspect, the method may include performing spatial and temporal correlations of observed mobile device behaviors to detect high-level mobile device behaviors.

Further aspects include a computing device that may include a processor, means for performing real-time behavior analysis of mobile device behaviors to generate coarse observations, means for identifying suspicious behavior from the coarse observations, means for dynamically determining the mobile device behaviors that require further observation in greater detail, means for dynamically determining a level of detail required for the further observation, means for performing finer observations based on the determined level of detail required for the further observation, and means for identifying suspicious behavior from the finer observations. In an aspect, the computing device may include means for performing mobile devices operations to correct the identified suspicious behavior. In a further aspect, the computing device may include means for performing spatial and temporal correlations of observed mobile device behaviors to detect high-level mobile device behaviors.

Further aspects include a computing device that includes a processor configured with processor-executable instructions to perform operations including performing real-time behavior analysis of mobile device behaviors to generate coarse observations, identifying suspicious behavior from the coarse observations, dynamically determining the mobile device behaviors that require further observation in greater detail, dynamically determining a level of detail required for the further observation, performing finer observations based on the determined level of detail required for the further observation, and identifying suspicious behavior from the finer observations. In an aspect, the processor is configured with processor-executable instructions to perform operations further including performing mobile devices operations to correct the identified suspicious behavior. In a further aspect, the processor is configured with processor-executable instructions to perform operations further including performing spatial and temporal correlations of observed mobile device behaviors to detect high-level mobile device behaviors.

Further aspects include a non-transitory server-readable storage medium having stored thereon processor-executable instructions configured to cause a computing device to perform operations that may include performing real-time behavior analysis of mobile device behaviors to generate coarse observations, identifying suspicious behavior from the coarse observations, dynamically determining the mobile device behaviors that require further observation in greater detail, dynamically determining a level of detail required for the further observation, performing finer observations based on the determined level of detail required for the further observation, and identifying suspicious behavior from the finer observations. In an aspect, the stored processor-executable software instructions are configured to cause a processor to perform operations including performing mobile devices operations to correct the identified suspicious behavior. In a further aspect, the stored processor-executable software instructions are configured to cause a processor to perform operations including performing spatial and temporal correlations of observed mobile device behaviors to detect high-level mobile device behaviors.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
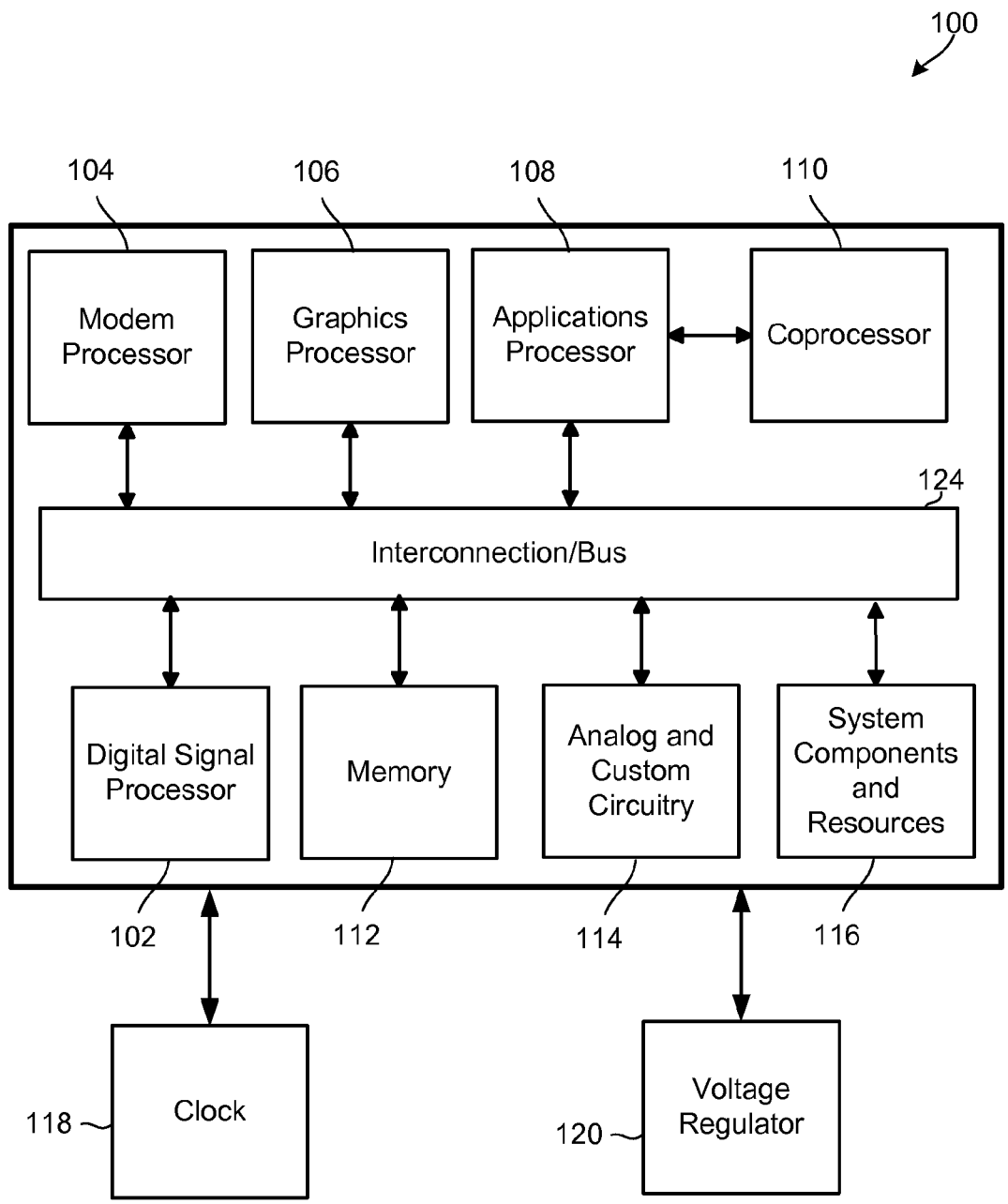
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein to refer to machine language code (such as object code) whose format is understandable by a processor.

The term "performance degradation" is used herein to refer to a wide variety of undesirable mobile device operations and characteristics, such as longer processing times, lower battery life, loss of private data, malicious economic activity (e.g., sending unauthorized premium SMS message), operations relating to commandeering the mobile device or utilizing the phone for spying or botnet activities, etc.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Various other solutions exist for modeling the behavior of processes or application programs executing on a computing device, and such behavior models may be used to differentiate between malicious and benign process/programs on computing devices. However, these existing modeling solutions are not suitable for use on mobile devices because such solutions generally require the execution of computationally-intensive processes that consume a significant amount of processing, memory, and energy resources, all of which may be scarce on mobile devices. In addition, these solutions are generally limited to evaluating the behavior of individual application programs or processes, and do not provide an accurate or complete model of the performance-degrading mobile device behaviors. For these and other reasons, existing modeling solutions are not adequate for identifying the numerous factors that may contribute to a mobile device's degradation over time, for preventing mobile device degradation, or for efficiently restoring an aging mobile device to its original condition.

There are a variety of factors that may contribute to the degradation in performance and power utilization levels of a mobile device over time, including poorly designed software applications, malware, viruses, fragmented memory, background processes, etc. However, due to the complexity of modern mobile devices, it is increasingly difficult for users, operating systems, and/or application programs (e.g., anti-virus software, etc.) to accurately and efficiently identify the sources of such problems and/or to provide adequate remedies to identified problems. As a result, mobile device users currently have few remedies for preventing the degradation in performance and power utilization levels of a mobile device over time, or for restoring an aging mobile device to its original performance and power utilization levels.

The various aspects provide devices, systems, and methods for efficiently identifying, preventing, and/or correcting the conditions and/or mobile device behaviors that often degrade a mobile device's performance and/or power utilization levels over time.

As mentioned above, mobile devices are resource constrained systems that have relatively limited processing, memory, and energy resources. As also mentioned above, modern mobile devices are complex systems, and there are a large number (i.e., thousands) of factors that may contribute to the mobile device's degradation over time. Due to these constraints, it is often not feasible to monitor/observe all the various processes, behaviors, or factors (or combinations thereof) that may degrade performance and/or power utilization levels of the complex yet resource-constrained systems of modern mobile devices.

To overcome the above mentioned limitations of existing solutions, the various aspects intelligently, dynamically, and/or adaptively determine mobile device behaviors that are to be observed, the number of behaviors that are to be observed, and the level of detail (i.e., granularity) at which the mobile device behaviors are to be observed. The various aspects efficiently identify suspicious or performance-degrading mobile device behaviors without consuming an excessive amount of processing, memory, or energy resources. Various aspects may correct suspicious or performance-degrading mobile device behaviors. Various aspects may prevent the identified suspicious or performance-degrading mobile device behaviors from degrading the performance and power utilization levels of a mobile device over time. Various aspects may restore an aging mobile device to its original performance and power utilization levels.

In an aspect, a mobile device processor may be configured to observe any or all of library application programming interface (API) calls, system call APIs, file-system operations, networking sub-system operations, driver API calls for the numerous sensors, state changes, and other similar events/operations at a high level, and perform real-time behavior analysis operations based on these high level observations to identify programs/processes that may contribute to the mobile device's degradation over time (e.g., programs that are actively malicious, poorly written, etc.). The mobile device processor may be configured to intelligently increase the level of detail (i.e., granularity) at which the mobile device behaviors are to be observed until enough information is available to identify and/or correct the cause of a suspicious or performance-degrading mobile device behavior.

In an aspect, the mobile device processor may be configured to dynamically change the set of observed behaviors (e.g., by selecting new behaviors to observe, observing fewer behaviors, etc.) based on the results of the on-line real-time analysis operations and/or the availability of system resources.

In various aspects, the mobile device processor may be configured to dynamically adjust the observation granularity (i.e., the level of detail at which mobile device behaviors are observed) based on the results of the real-time analysis operations and/or based on the availability of system resources. For example, in various aspects, the mobile device processor may be configured to recursively increase the granularity of one or more observations (i.e., make finer or more detailed observations) until a source of a suspicious or performance-degrading mobile device behavior is identified, until a processing threshold is reached, or until the mobile device processor determines that the source of the suspicious or performance-degrading mobile device behavior cannot be identified from further increases in observation granularity.

In an aspect, the mobile device processor may be configured to dynamically adjust the observation granularity based on the availability of system resources. For example, the mobile device processor may be configured to increase the observation granularity in response to determining that mobile device resources are available or underutilized, or that the mobile is currently connected to a power supply, and/or to reduce the observation granularity in response to determining that the computing device is under heavy load or low battery.

In an aspect, an observer process/daemon/module/sub-system (herein collectively referred to as a "module") of the mobile device may instrument various application programming interfaces (APIs) at various levels of the mobile device system, collect information from the instrumented APIs, and generate a behavior vector based on the collected information. The observer module may send the generated behavior vector to an analyzer module (e.g., via a memory write operation, etc.) of the mobile device, which may generate spatial and/or temporal correlations based on information included in the behavior vector and/or information collected from various other mobile device sub-systems. The generated spatial and/or temporal correlations may be used by various modules (e.g., by an actuation module, etc.) of the mobile device to identify and/or respond to behaviors that are determined to have a high probably of negatively impacting the mobile device's performance or battery consumption levels.

The various aspects may be implemented on a number of single processor and multiprocessor systems, including a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 102, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

In addition to the SOC 100 discussed above, the various aspects may be implemented in a wide variety of computing systems, which may include a single processor, multiple processors, multicore processors, or any combination thereof.

Figure 2:
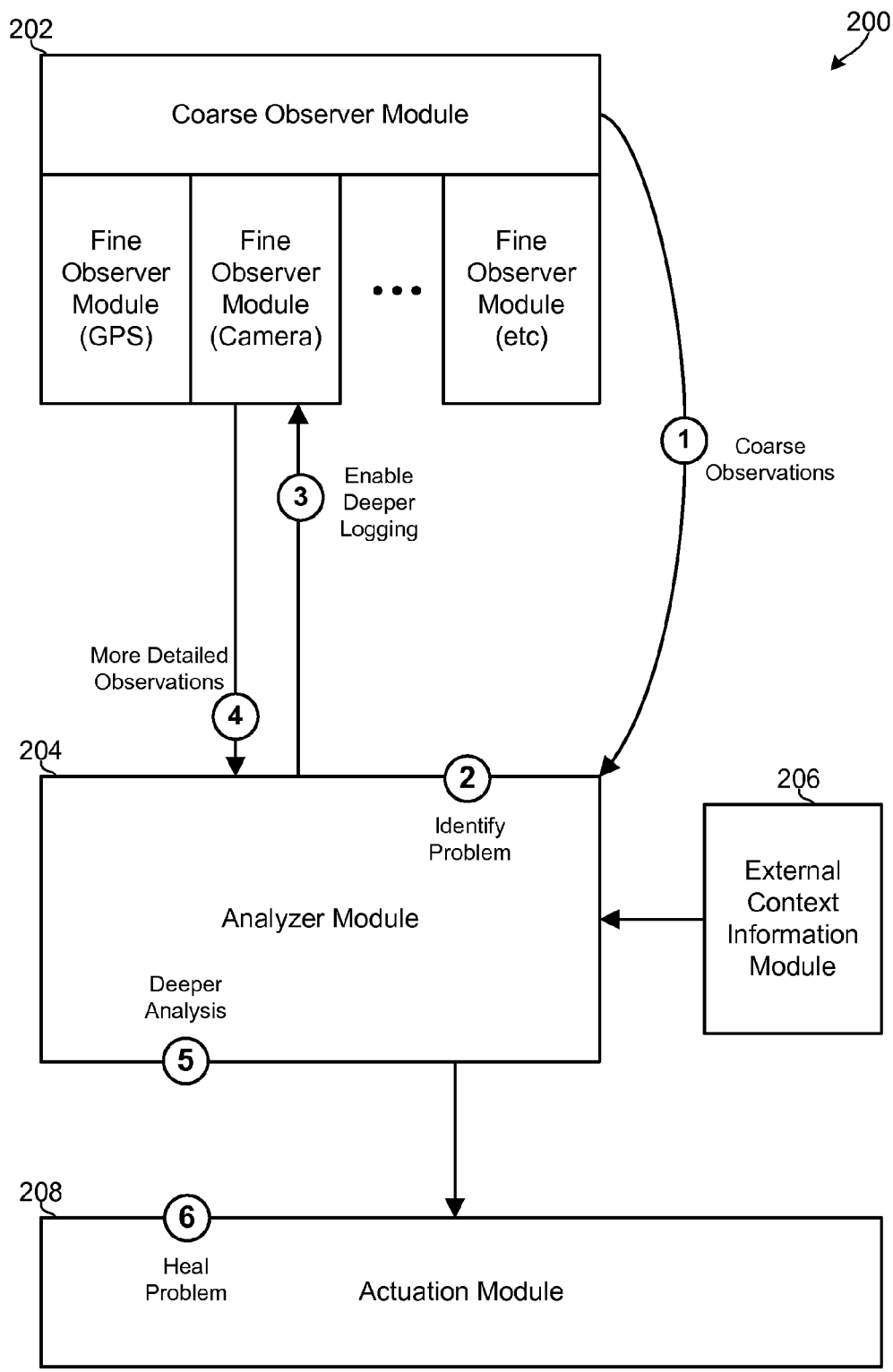
FIG. 2 is a block diagram illustrating example logical components and information flows in a computing system configured to perform dynamic and adaptive observations in accordance with the various aspects.

FIG. 2 illustrates example logical components and information flows in a computing system 200 configured to perform dynamic and adaptive observations in accordance with the various aspects. In the example illustrated in FIG. 2, the computing system 200 includes a coarse observer module 202, an analyzer module 204, an external context information module 206, and an actuation module 208. In various aspects, such modules may be implemented in software, hardware, or any combination thereof. In various aspects, the modules may be implemented within parts of the operating system (e.g., within the kernel, in the kernel space, in the user space, etc.), within separate programs or applications, in specialized hardware buffers or processors, or any combination thereof. In an aspect, one or more of the modules may be implemented as software instructions executing on one or more processors of the mobile device.

The observer module 202 may be configured to instrument/coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, efficiently store the generated observations in a memory, and send (e.g., via memory writes, function calls, etc.) the generated observations to the analyzer module 204.

The analyzer module 204 may include intelligence for utilizing the limited set of information (i.e., coarse observations) to identify behaviors, processes, or programs that are contributing to (or are likely to contribute to) the device's degradation over time, or which may otherwise cause problems on the device. For example, the analyzer module 204 may be configured to analyze information (e.g., in the form of observations) collected from various modules (e.g., the observer module 202, external context information module 206, etc.), learn the normal operational behaviors of the mobile device, generate behavior models of the mobile device's behaviors, and compare the generated models to information/observations received from the observer module 202 to identify suspicious mobile device behaviors.

As mentioned above, the observer module 202 may monitor/observe mobile device operations and events. In various aspects, observing mobile device operations and events may include collecting information pertaining to any or all of library API calls in an application framework or run-time libraries, system call APIs, file-system and networking sub-system operations, device (including sensor devices) state changes, and other similar events. In an aspect, the observer module 202 may monitor file system activity, which may include searching for filenames, categories of file accesses (personal info or normal data files), creating or deleting files (e.g., type exe, zip, etc.), file read/write/seek operations, changing file permissions, etc. In an aspect, the observer module 202 may monitor data network activity, which may include types of connections, protocols, port numbers, server/client that the device is connected to, the number of connections, volume or frequency of communications, etc. In an aspect, the observer module 202 may monitor phone network activity, which may include monitoring the type and number of calls or messages (e.g., SMS, etc.) sent out, received, or intercepted (e.g., the number of premium calls placed). In an aspect, the observer module 202 may monitor the system resources that are used, which may include monitoring the number of forks, memory uses, number of files open, etc. In an aspect, the observer module 202 may monitor the device state, which may include monitoring various factors, such as whether the display is on or off, whether the device is locked or unlocked, the amount of battery remaining, the state of the camera, etc. In an aspect, the observer module 202 may also monitor inter-process communications (IPC) by, for example, monitoring intents to crucial services (browser, contracts provider, etc.), the degree of inter-process communications, pop-up windows, etc.

To reduce the number of factors monitored to a manageable level, in operation 1 illustrated in FIG. 2, the observer module 202 may perform coarse observations by monitoring/observing a small subset of the factors that could contribute to the mobile device's degradation, and send the coarse observations to the analyzer module 204. In an embodiment, the initial set of behaviors and/or subset of the factors may be selected by analysis of benign and problematic applications on mobile devices.

In operation 2, the analyzer module 204 may receive the coarse observations from the observer module 202 and identify subsystems, processes, and/or applications associated with the received coarse observations that may potentially contribute to the mobile device's degradation. This may be achieved by, for example, the analyzer module 204 comparing the received information with contextual information received from the external context information module 206.

In operation 3, the analyzer module 204 may instruct the observer module 202 to perform or enable deeper logging/observations or final logging on the identified subsystems, processes or applications. In operation 4, the observer module 202 may perform deeper observations on the identified subsystems, processes or applications. In operation 5, the observer module 202 may send the results of the deeper observations to the analyzer module 204 for further (and deeper) analysis. Operations 1-5 may be repeated until the source of a problem is identified or until it is determined that the identified subsystems, processes or applications are not likely to cause problems or degradation. In operation 6, the analyzer module 204 may send the results of the analysis to the actuation module 208, which may receive the results and perform operations to heal, cure, isolate, or otherwise fix the identified problem.

In an aspect, the observer module 202 and the analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the observer module 202 enables the computing system 200 to efficiently identify and prevent problems from occurring on mobile devices without requiring a large amount of processor, memory, or battery resources on the device.

In an aspect, the observer module 202 may store the observations in a space efficient and query-service-time efficient manner to reduce the performance-impact on benign applications. The observer module 202 may provide the system with various observer modes to enable multi-level logging (e.g., fine grained and coarse-grained logging). The observer module 202 may provide the ability to automatically and dynamically switch between the different observer modes. The observer module 202 may monitor and restrict process/application that may exhaust system resources. The observer module 202 may manage communications (e.g., non-secure to secure world) overhead, such that the overhead is minimal and flow control is maintained/performed efficiently.

In an aspect, the analyzer module 204 may be configured to receive and analyze information collected by various mobile device sub-systems and/or over various time periods to learn the normal operational behaviors of the mobile device under a variety of contexts and conditions, and generate models of normal mobile device behaviors under the various contexts/conditions. In an aspect, the analyzer module 204 may be configured to correlate the received observations against the generated behavior models, and perform behavior analysis operations based on the correlations to determine whether the received observations conflict with (or do not match) the learned normal operational behaviors.

Figure 3:
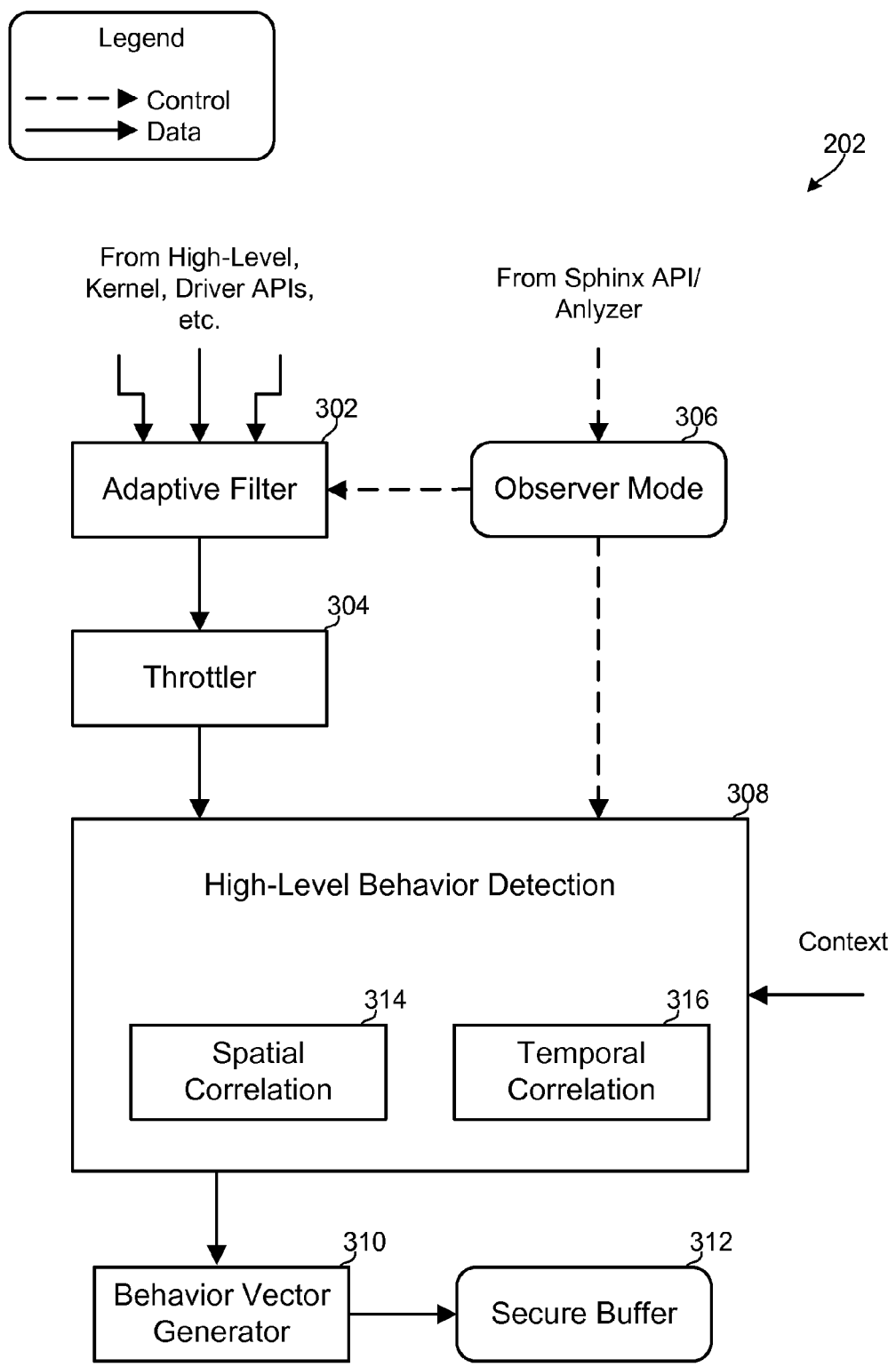
FIG. 3 is a block diagram illustrating example logical components and information flows in an observer module configured to perform dynamic and adaptive observations in accordance with an aspect.

FIG. 3 illustrates example logical components and information flows in an observer module 202 of a computing system configured to perform dynamic and adaptive observations in accordance with an aspect. The observer module 202 may include an adaptive filter module 302, a throttle module 304, an observer mode module 306, a high-level behavior detection module 308, a behavior vector generator 310, and a secure buffer 312. The high-level behavior detection module 308 may include a spatial correlation module 314 and a temporal correlation module 316.

The observer mode module 306 may receive control information from various sources, which may include an analyzer unit (e.g., the analyzer module 204 described above with reference to FIG. 2) and/or an application API. The observer mode module 306 may send control information pertaining to various observer modes to the adaptive filter module 302 and the high-level behavior detection module 308.

The adaptive filter module 302 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 304, which may be responsible for controlling the amount of information flowing from the filter to ensure that the high-level behavior detection module 308 does not become flooded or overloaded with requests or information.

The high-level behavior detection module 308 may receive data/information from the throttle module 304, control information from the observer mode module 306, and context information from other components of the mobile device. The high-level behavior detection module 308 may use the received information to perform spatial and temporal correlations to detect or identify high level behaviors that may cause the device to perform at sub-optimal levels. The results of the spatial and temporal correlations may be sent to the behavior vector generator 310, which may receive the correlation information and generate a behavior vector that describes the behaviors of particular process, application, or sub-system. In an aspect, the behavior vector generator 310 may generate the behavior vector such that each high-level behavior of a particular process, application, or sub-system is an element of the behavior vector. In an aspect, the generated behavior vector may be stored in a secure buffer 312. Examples of high-level behavior detection may include detection of the existence of a particular event, the amount or frequency of another event, the relationship between multiple events, the order in which events occur, time differences between the occurrence of certain events, etc.

In the various aspects, the observer module 202 may perform adaptive observations and control the observation granularity. That is, the observer module 202 may dynamically identify the relevant behaviors that are to be observed, and dynamically determine the level of detail at which the identified behaviors are to be observed. In this manner, the observer module 202 enables the system to monitor the behaviors of the mobile device at various levels (e.g., multiple coarse and fine levels). The observer module 202 may enable the system to adapt to what is being observed. The observer module 202 may enable the system to dynamically change the factors/behaviors being observed based on a focused subset of information, which may be obtained from a wide verity of sources.

As discussed above, the observer module 202 may perform adaptive observation techniques and control the observation granularity based on information received from a variety of sources. For example, the high-level behavior detection module 308 may receive information from the throttle module 304, the observer mode module 306, and context information received from other components (e.g., sensors) of the mobile device. As an example, a high-level behavior detection module 308 performing temporal correlations might detect that a camera has been used and that the mobile device is attempting to upload the picture to a server. The high-level behavior detection module 308 may also perform spatial correlations to determine whether an application on the mobile device took the picture while the device was holstered and attached to the user's belt. The high-level behavior detection module 308 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 308 may recognize this as a potentially threatening behavior and initiate an appropriate response (e.g., shutting off the camera, sounding an alarm, etc.).

In an aspect, the observer module 202 may be implemented in multiple parts.

Figure 4:
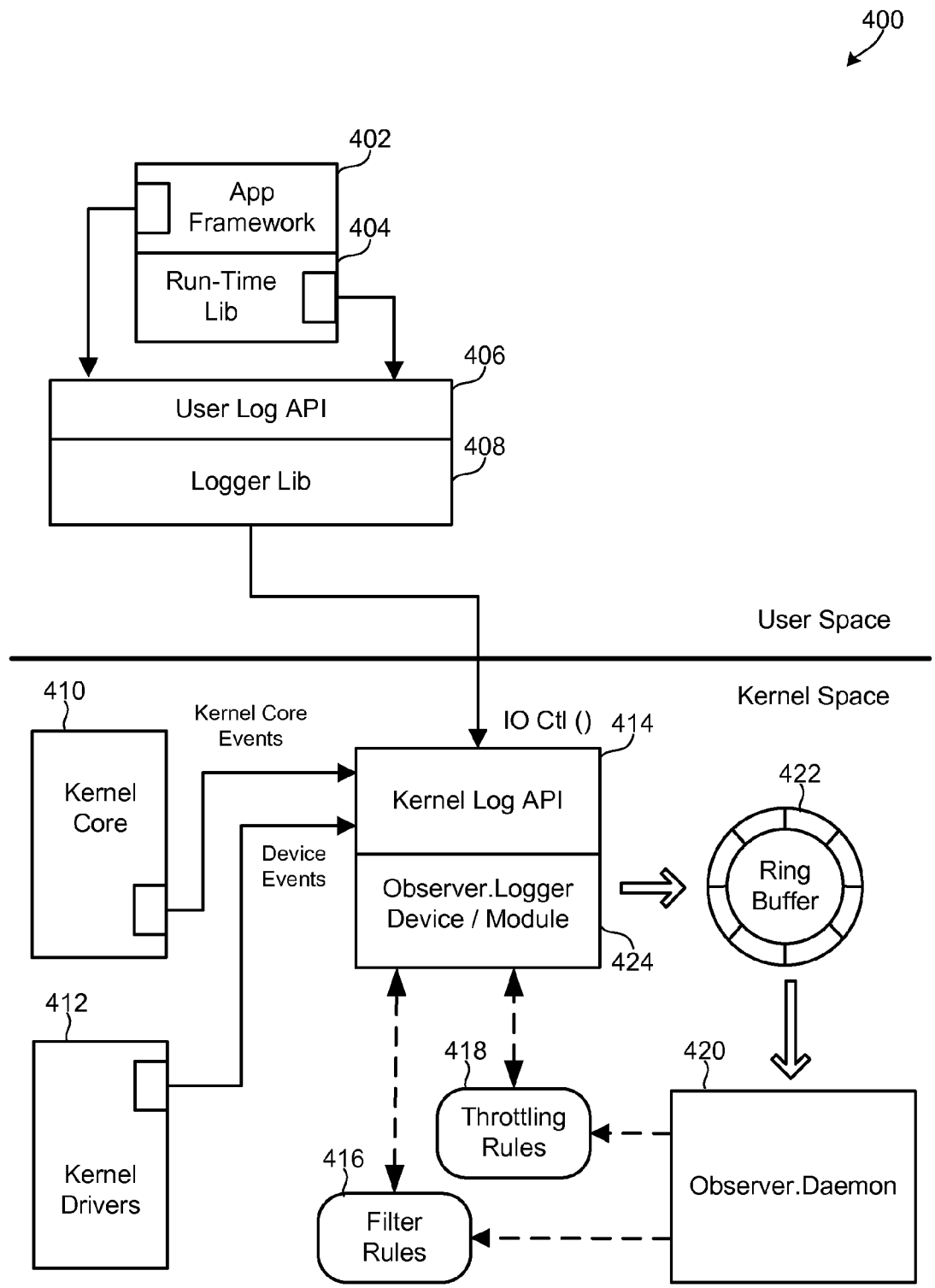
FIG. 4 is a block diagram illustrating logical components and information flows in a computing system implementing observer modules in accordance with an aspect.

FIG. 4 illustrates logical components and information flows in an example computing system 400 implementing an observer module in accordance with an aspect. The illustrated computing system 400 includes an application framework 402, a run time library 404, a user log API 406, and a logger library 408 in the user space. The computing system 400 may include a kernel core 410, kernel drivers 412, a kernel log API 414, an observer logger 424, a filter rules module 416, a throttling rules module 418, a ring buffer 422, and an observer daemon 420 in the kernel space. In an aspect, the ring buffer 422 may be a fixed-sized and/or circular buffer. In an aspect, the combination of the user log API 406 and the kernel log API 414 may constitute the observer logger 424. In an aspect, the combination of the observer daemon 420 and the observer logger 424 may constitute the observer module 202.

The application framework 402 and the run time library 404 may be preexisting software code/components of the mobile device, each of which may be instrumented with logic to monitor activities and send information to the user log API 406 in the user space. The user log API 406 may provide an API that enables the user space applications to communicate with the kernel via the kernel log API 414.

In an aspect, the observer logger 424 may be automatically invoked whenever a particular event, action, or API (e.g., an API identified in a list of APIs as being of particular importance) is invoked, and the corresponding information may be stored in the ring buffer 422. The information stored in the ring buffer 422 may include, for example, information for identifying the caller, information for identifying the exact function being called, the parameters that have been passed to the function call, and other similar information. In an aspect, this information may be stored in the ring buffer 422 in a raw format. Alternatively, the ring buffer 422 may be used to store information after the log has been processed.

The observer logger 424 may be controlled by a set of filter and throttling rules 416, 418. The filter rules 416 may specify whether a particular API is to be logged or not. The throttling rules 418 may specify conditions under which the system is to termination the logging/monitoring of a specific API to prevent overloads.

The filter and throttling rules 416, 418 may be created, updated, and/or maintained by the observer daemon 420. For example, if after observing the mobile device for ten minutes, the observer daemon 428 decides that a particular API is no longer of interest (e.g., it is not providing the system with useful information), the observer daemon 420 may update the filter rules 416 such that events relating to that particular API are no longer monitored/logged.

Figure 5A:
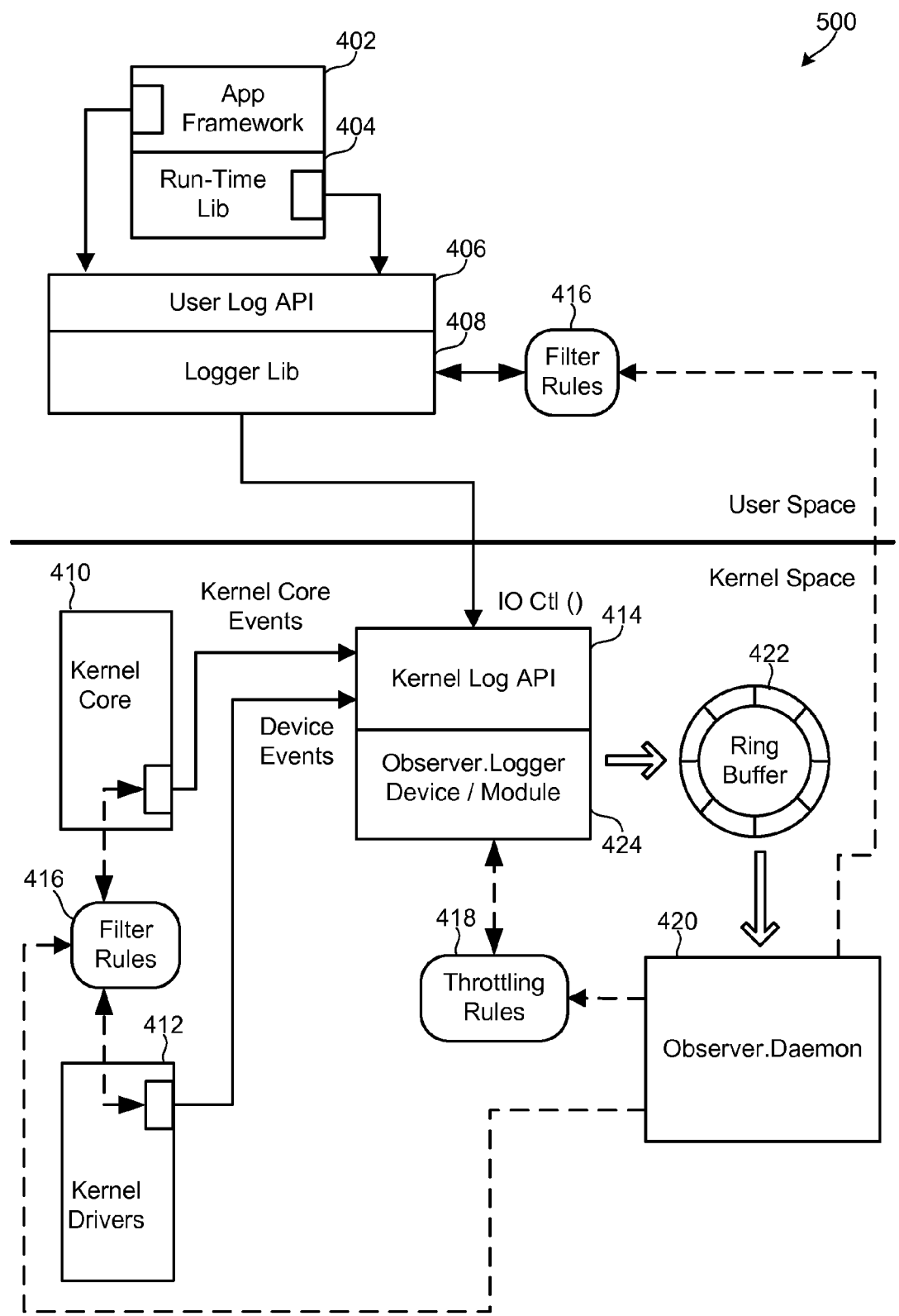
FIG. 5A is block diagram illustrating logical components and information flows in a computing system implementing observer modules in accordance with another aspect.

FIG. 5A illustrates logical components and information flows in a computing system 500 implementing an observer module 202 in accordance with another aspect. The computing system 500 illustrated in FIG. 5A includes all the components described above with reference to FIG. 4, except that the filter rules 416 are enforced on the user log API 406 in the user space and/or kernel space on the device. Thus, instead of each call coming to the observer logger 424 and the observer logger 424 deciding whether the call should be logged or not (as described with reference to FIG. 4), the filter rules 416 may be implemented within the instrumentations (e.g., user log API, etc.) such that the call itself will not reach the logger based on the filter rules 416. Implementing the configuration illustrated in FIG. 5A may further improve the mobile device efficiency because function calls do not need to be made to a logger inside the kernel.

Figure 5B:
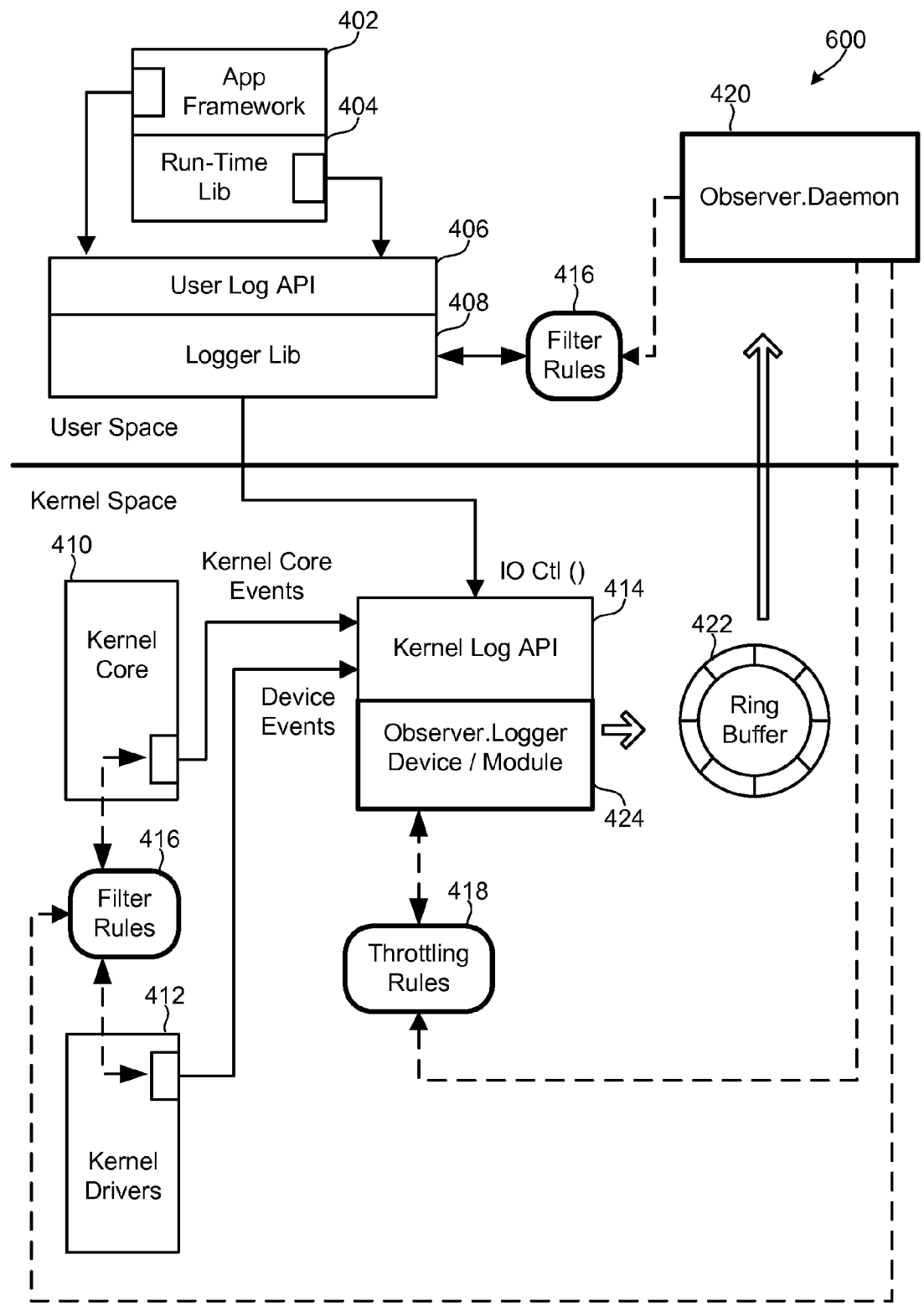
FIG. 5B is block diagram illustrating logical components and information flows in a computing system implementing observer modules in accordance with another aspect.

FIG. 5B illustrates logical components and information flows in a computing system 550 implementing an observer module in accordance with yet another aspect. The computing system 550 illustrated in FIG. 5B includes all the components described above with reference to FIG. 5A, except that the observer daemon 420 is in the user space. In an aspect, the observer daemon 420, filter rules 416, throttling rules 418, and observer logger 424 may be part of the same component Implementing the configuration illustrated in FIG. 5B may further improve the mobile device efficiency because the observer daemon 420 may update the filter rules without functions calls into the kernel space.

Figure 6A:
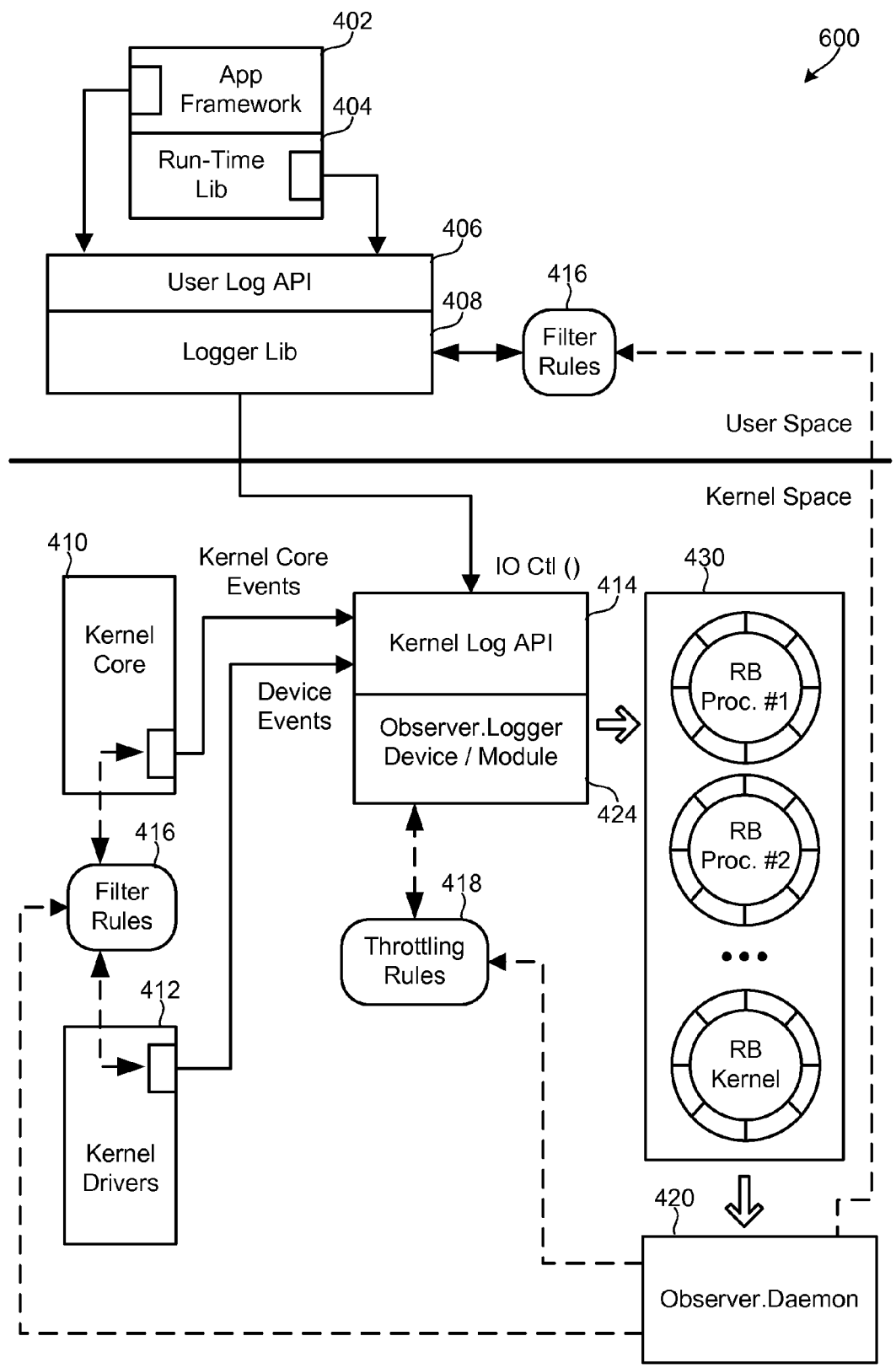
FIG. 6A is block diagram illustrating logical components and information flows in a computing system implementing observer modules in accordance with another aspect.
Figure 6B:
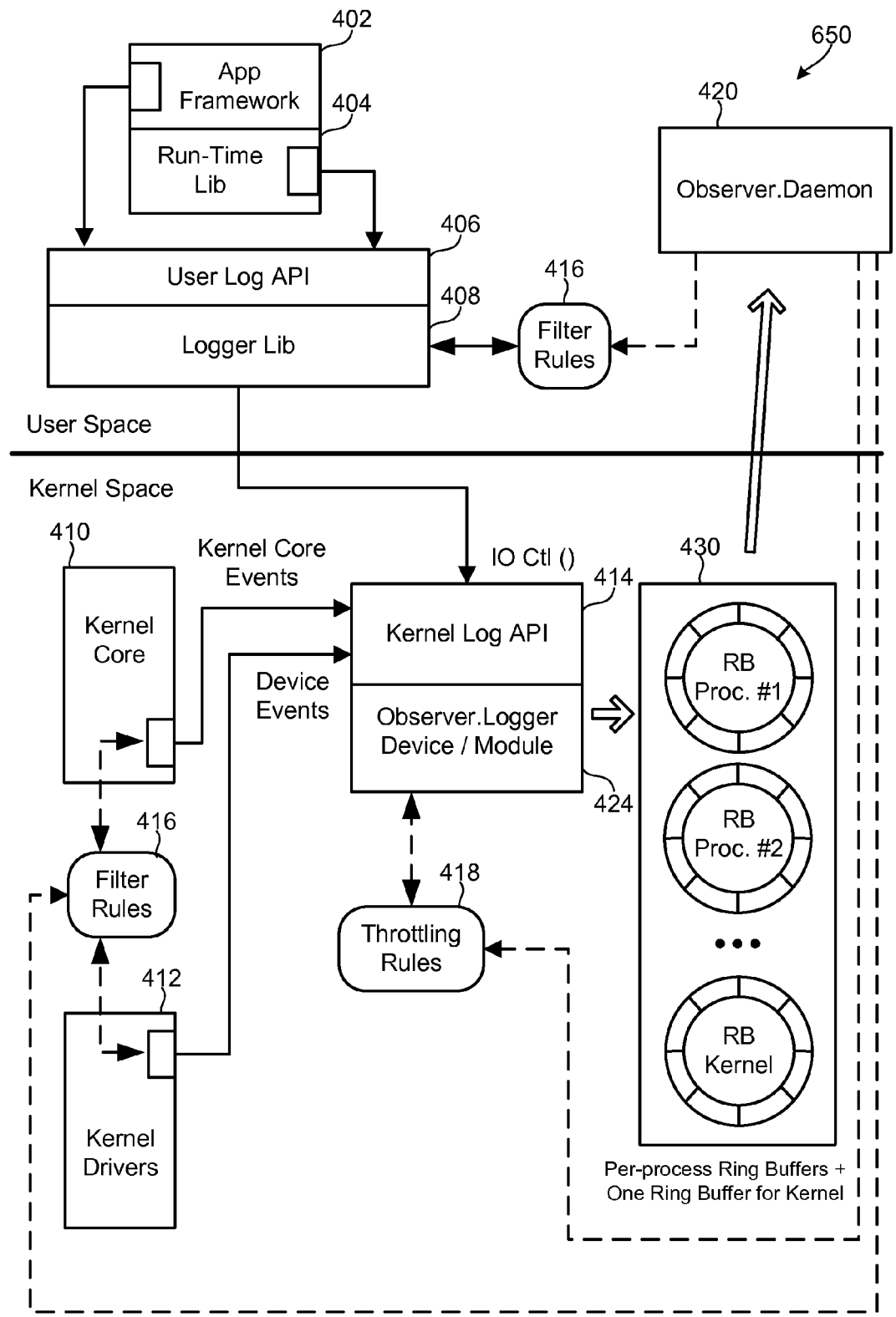
FIG. 6B is block diagram illustrating logical components and information flows in a computing system implementing observer modules in accordance with another aspect.

At any given time, several applications and several kernel threads may be attempting to store/write information in the ring buffer, which may cause contention issues that hinder scalability. In an aspect, the system's scalability may be improved via the inclusion of multiple ring buffers, as illustrated in FIGS. 6A-B. The computing system 600 illustrated in FIG. 6A includes all the components described above with reference to FIG. 5A, but includes multiple ring buffers 430. The computing system 600 may include a ring buffer for each application, throttle, and kernel thread being monitored by the system. For example, the computing system 600 may include a ring buffer for a kernel thread being monitored by the system, and one or more ring buffers for each application and/or throttle being monitored by the system. Alternatively, the computing system 600 may include a ring buffer for groups of applications, groups of throttles, and/or groups of kernel threads being monitored by the system. The inclusion of multiple ring buffers enables the computing system 600 to avoid contention issues from arising and reduces bottle necks.

The computing system 650 illustrated in FIG. 6B includes all the components described above with reference to FIG. 6A, except that the observer daemon 420 is in the user space. Implementing the configuration illustrated in FIG. 6B may further improve the mobile device efficiency because the observer daemon 420 may update the filter rules without functions calls into the kernel space.

Figure 7A:
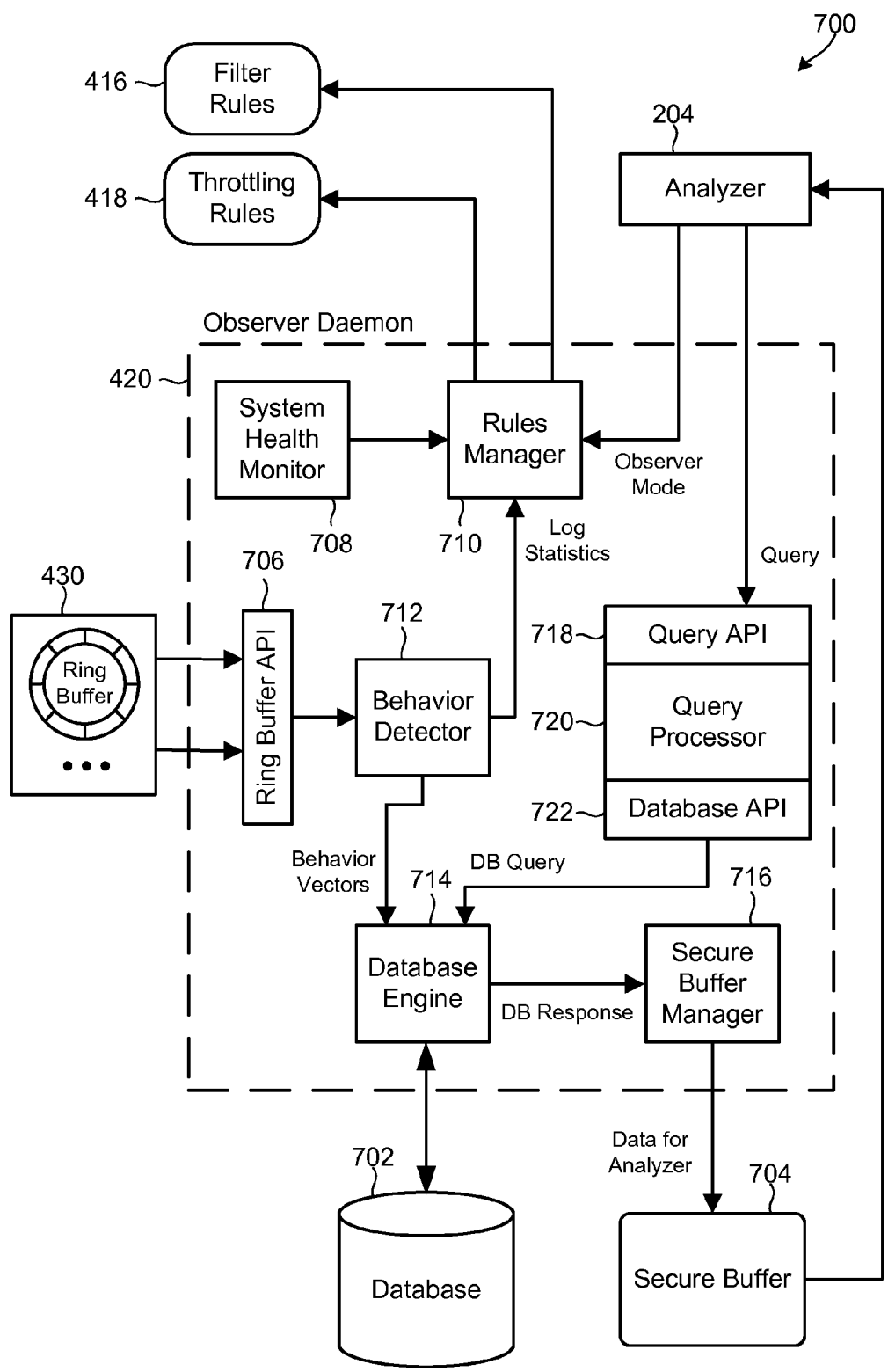
FIG. 7A is a block diagram illustrating logical components and information flows in a computing system implementing observer daemons in accordance with an aspect.

FIG. 7A illustrates logical components and information flows in a computing system 700 implementing an aspect observer daemon 420. The computing system 700 may include an analyzer component (e.g., the analyzer module 204 illustrated in FIG. 2), a filter rules 416 component, a throttling rules 418 component, multiple ring buffers 430, a database 702, a secure buffer 704, and an observer daemon 420. The observer daemon 420 may include a ring buffer API 706, system health monitor 708, a behavior detector 712, a database engine 714, a rules manager 710, a secure buffer manager 716, a query processor 720, a query API 718, a database API 722. A logger (not illustrated) may store information in the ring buffers 430. The observer daemon 420 may extract the information from the ring buffers 430 via the ring buffer API 706. The behavior detector 712 may receive information from the ring buffer API 706, and perform correlation and formatting operations on the received data to generate a behavior vector.

The generated behavior vector may be sent to the database engine 714 for storing in the database 702. The database engine 714 may manage all of the specificities of the database implementation (e.g., kind of data structure that is implemented, types of information included in the data structure, etc.).

The rules manager 710 may be configured to receive inputs from different components (e.g., system health monitor, behavior detection unit, analyzer, etc.), and update the filter and throttle rules 416, 418 based on the received inputs. For example, the rules manager 710 may receive log statistics from the behavior detector 712 and update the filter and throttle rules 416, 418 based on the log statistics.

The system health monitor 708 may be configured to monitor system resources, and inform the rules manager 710 of the system health. For example, the system health monitor 708 may inform the rules manager 710 about the amount of energy that remains stored in the battery, how much memory is available, whether there are enough resources to perform a detailed observation, etc. The rules manager 710 may use the information received from the system health monitor 708 to update the rules. For example, if the system health monitor 708 indicates that the device battery state is below a certain threshold, the rules manager 710 may update the filter rules 416 such that the system performs more coarse observations in order to reduce power consumption.

The query processor 720 may be configured to perform conversions between various API's, such as from a query API 718 to a database-specific API 722.

The secure buffer 704 may enable kernel space components (e.g., in the un-trusted region) to communicate with the user space components (e.g., in the trusted region).

The secure buffer manager 716 may be configured to control the communications that occur via the secure buffer 704.

The database engine 714 may be configured to store the database response to the secure buffer manager 716, which may perform flow control operations and store the information in the secure buffer 704.

The information generated by the observer daemon 420 may be utilized by an analyzer 204, which may be implemented in the kernel space, user space, or in a trusted computing base of a system-on-chip (SOC).

Figure 7B:
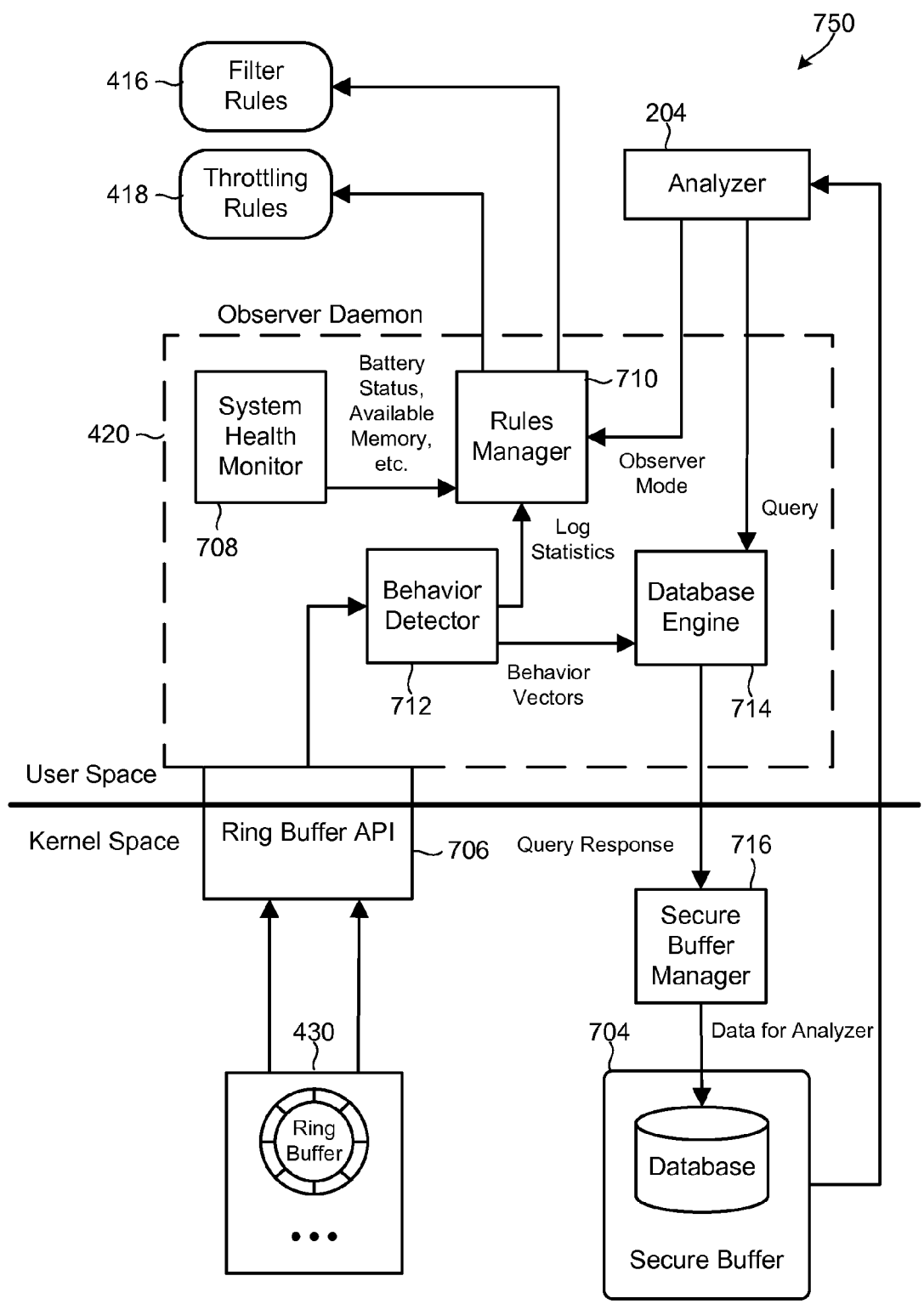
FIG. 7B is a block diagram illustrating logical components and information flows in a computing system implementing observer daemons in accordance with another aspect.

FIG. 7B illustrates logical components and information flows in a computing system 750 implementing another aspect observer daemon 420. The computing system 750 may include an analyzer 204 component, a filter rules 416 component, a throttling rules 418 component, multiple ring buffers 430, a secure buffer 704, a secure buffer manager 716, and an observer daemon 420. The observer daemon 420 may include a ring buffer API 706, system health monitor 708, a behavior detector 712, a database engine 714, and a rules manager 710. A logger (not illustrated) may store information in the ring buffers 430. The computing system 750 may perform the same operations as the computing system 700 illustrated in FIG. 7A, except that the secure buffer manager 716 is in the kernel space and may control the data that is sent to an analyzer 204 in the user space.

Figure 8A:
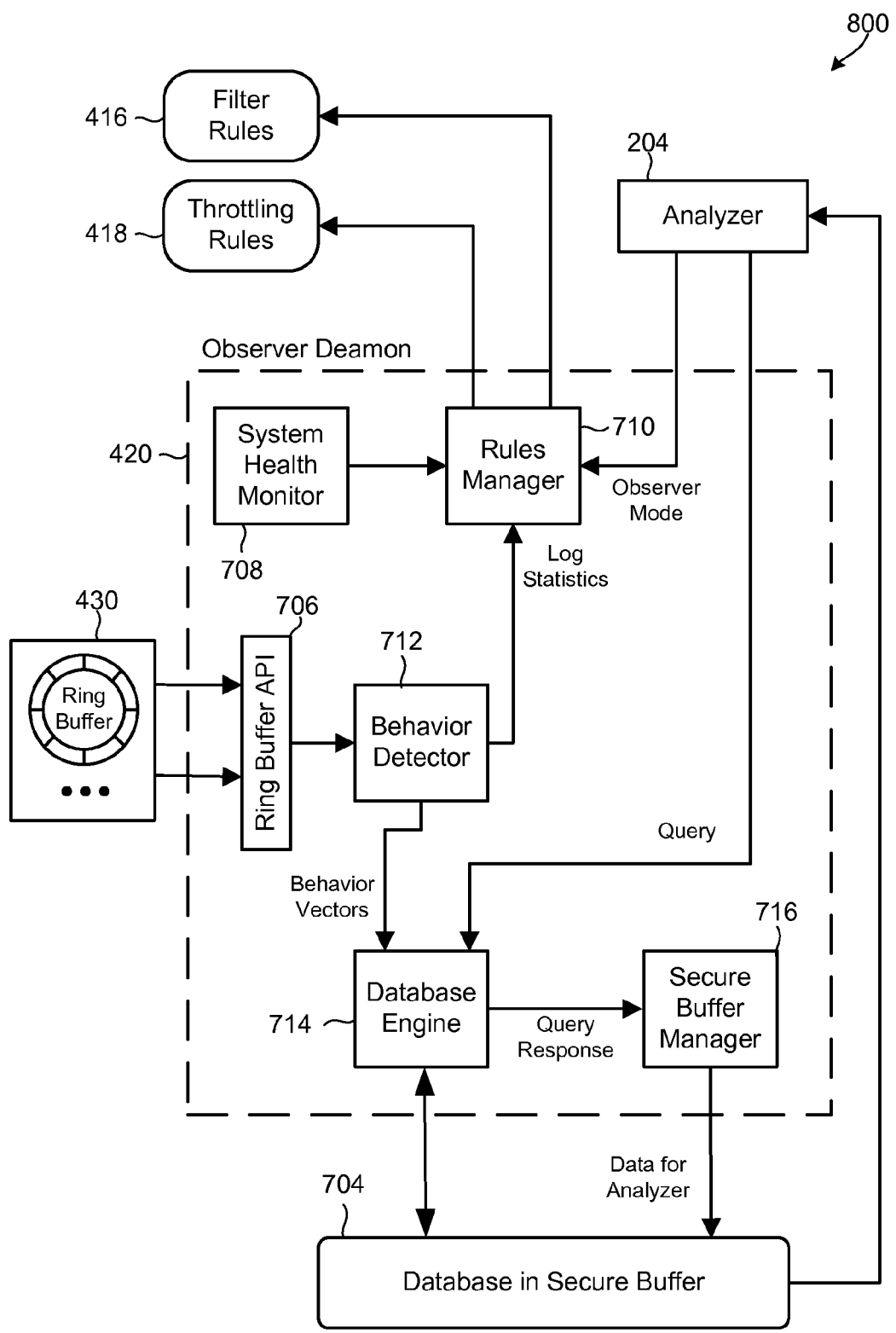
FIG. 8A is a block diagram illustrating logical components and information flows in a computing system implementing observer daemons in accordance with another aspect.

FIG. 8A illustrates logical components and information flows in a computing system 800 implementing another aspect observer daemon. The computing system 800 illustrated in FIG. 8A includes all of the components described above with reference to FIG. 7A, except for a query processor because the database in this aspect is included as part of the secure buffer. In this configuration, whenever the analyzer issues a query, the query may come directly from the database engine. Similarly, responses to the query may be sent directly from the secure buffer to the analyzer.

Figure 8B:
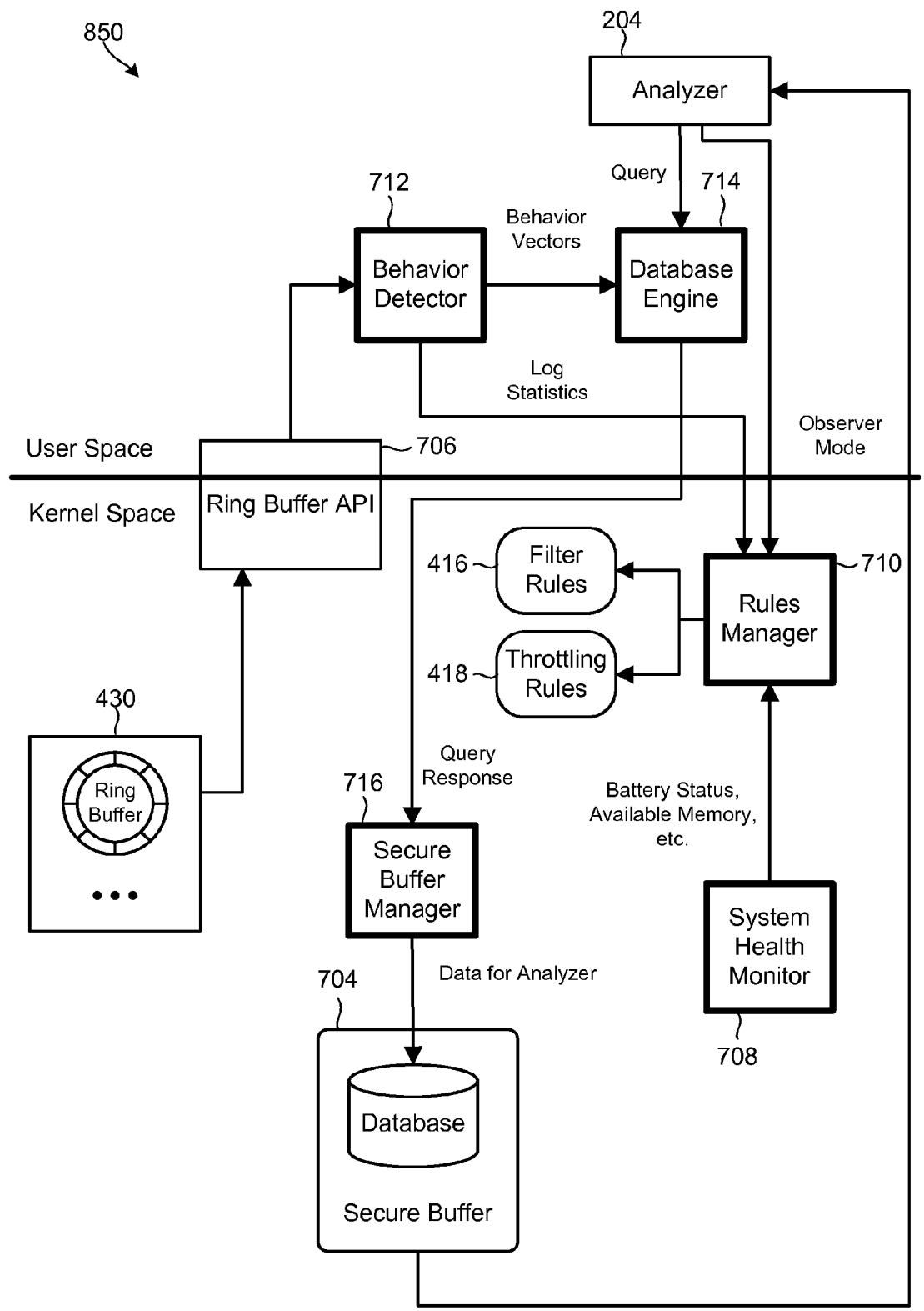
FIG. 8B is a block diagram illustrating logical components and information flows in a computing system implementing observer daemons in accordance with another aspect.

FIG. 8B illustrates logical components and information flows in a computing system 800 implementing yet another aspect observer daemon. In the example illustrated in FIG. 8B, the observer daemon includes a behavior detector 712 and a database engine 714 in the user space, and a secure buffer manager 716, a rules manager 710, and a system health monitor 708 in the kernel space.

The various aspects provide cross-layer observations on mobile devices encompassing webkit, SDK, NDK, kernel, drivers, and hardware in order to characterize system behavior. The behavior observations may be made in real time.

An important feature of the various aspects is that the observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 9:
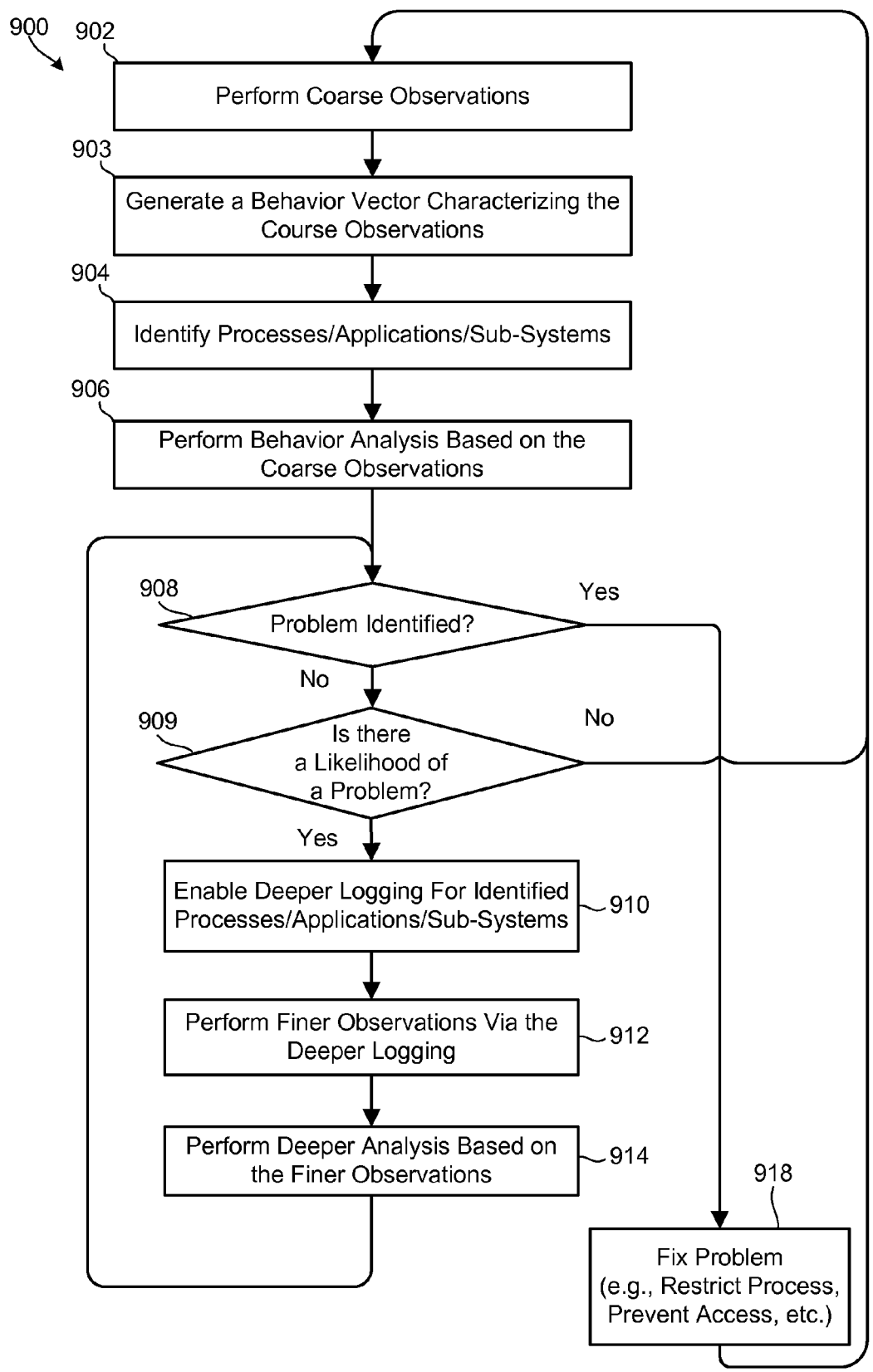
FIG. 9 is a process flow diagram illustrating an aspect method for performing adaptive observations on mobile devices.

FIG. 9 illustrates an example method 900 for performing dynamic and adaptive observations in accordance with an aspect. In block 902, the mobile device processor may perform coarse observations by monitoring/observing a subset of large number factors/behaviors that could contribute to the mobile device's degradation. In block 903, the mobile device processor may generate a behavior vector characterizing the coarse observations and/or the mobile device behavior based on the coarse observations. In block 904, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 906, the mobile device processor may perform behavioral analysis operations based on the coarse observations. In determination block 908, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 908="Yes"), in block 918, the processor may initiate a process to correct the behavior and return to block 902 to perform additional coarse observations.

When the mobile device processor determines that the suspicious behaviors or potential problems can not be identified and/or corrected based on the results of the behavioral analysis (i.e., determination block 908="No"), in determination block 909 the mobile device processor may determine whether there is a likelihood of a problem. In an embodiment, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 909="No"), the processor may return to block 902 to perform additional coarse observations.

When the mobile device processor determines that there is a likelihood that suspicious behaviors or potential problems exist and/or are detectable (i.e., determination block 909="Yes"), in block 910, the mobile device processor may perform deeper logging/observations or final logging on the identified subsystems, processes or applications. In block 912, the mobile device processor may perform deeper and more detailed observations on the identified subsystems, processes or applications. In block 914, the mobile device processor may perform further and/or deeper behavioral analysis based on the deeper and more detailed observations. In determination block 908, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 908="No"), the processor may repeat the operations in blocks 910-914 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 908="Yes"), in block 918, the mobile device processor may perform operations to correct the problem/behavior, and the processor may return to block 902 to perform additional operations.

In an aspect, as part of blocks 902-918 of method 900, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 10:
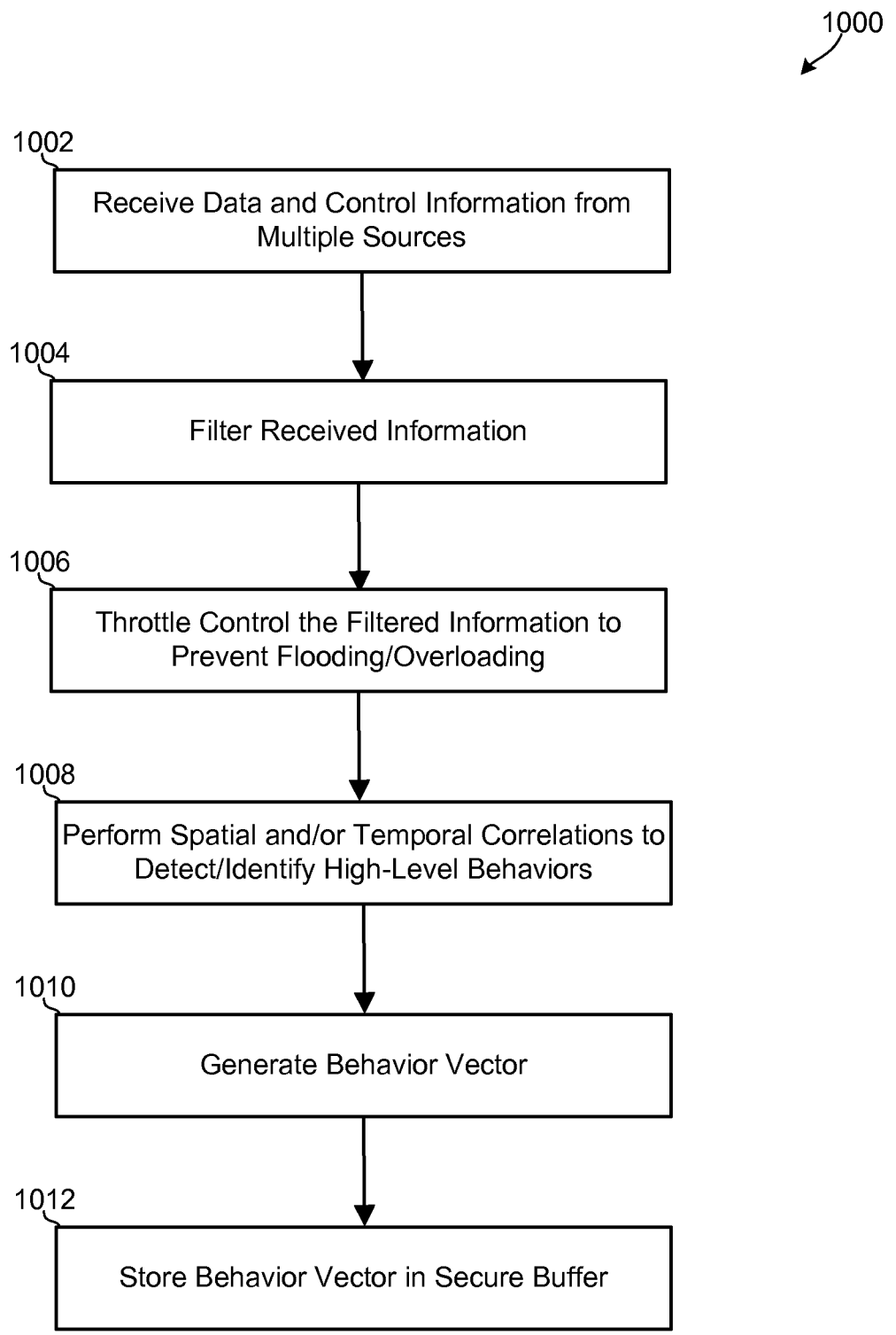
FIG. 10 is a process flow diagram illustrating another aspect method for performing adaptive observations on mobile devices.

FIG. 10 illustrates an example observer method 1000 for performing dynamic and adaptive observations on a mobile device processor in accordance with an aspect. The observer method 1000 may be implemented as part of an observer module in the mobile device's kernel space, user space, or a combination thereof. In block 1002, the observer module operating on the processor may receive data, control, and/or context information from various sources, which may include an analyzer unit (e.g., analyzer module 204 described in FIG. 2), application APIs, Driver APIs, kernel threads, user threads, processes, programs, mobile device sensors, etc. In block 1004, the observer module operating on the processor may adaptively and intelligently filter the received information to generate a smaller subset of the received information. In block 1006, the observer module operating on the processor may throttle control the filtered information to control/prevent flooding or overloading. In block 1008, the observer module operating on the processor may perform spatial and temporal correlations to detect/identify high level behaviors that may cause the device to perform at sub-optimal levels. In block 1010, the observer module operating on the processor may generate a behavior vector that describes the behaviors of particular process, application, or sub-system. In block 1012, the observer module operating on the processor may store the generated behavior vector in a secure buffer.

Figure 11:
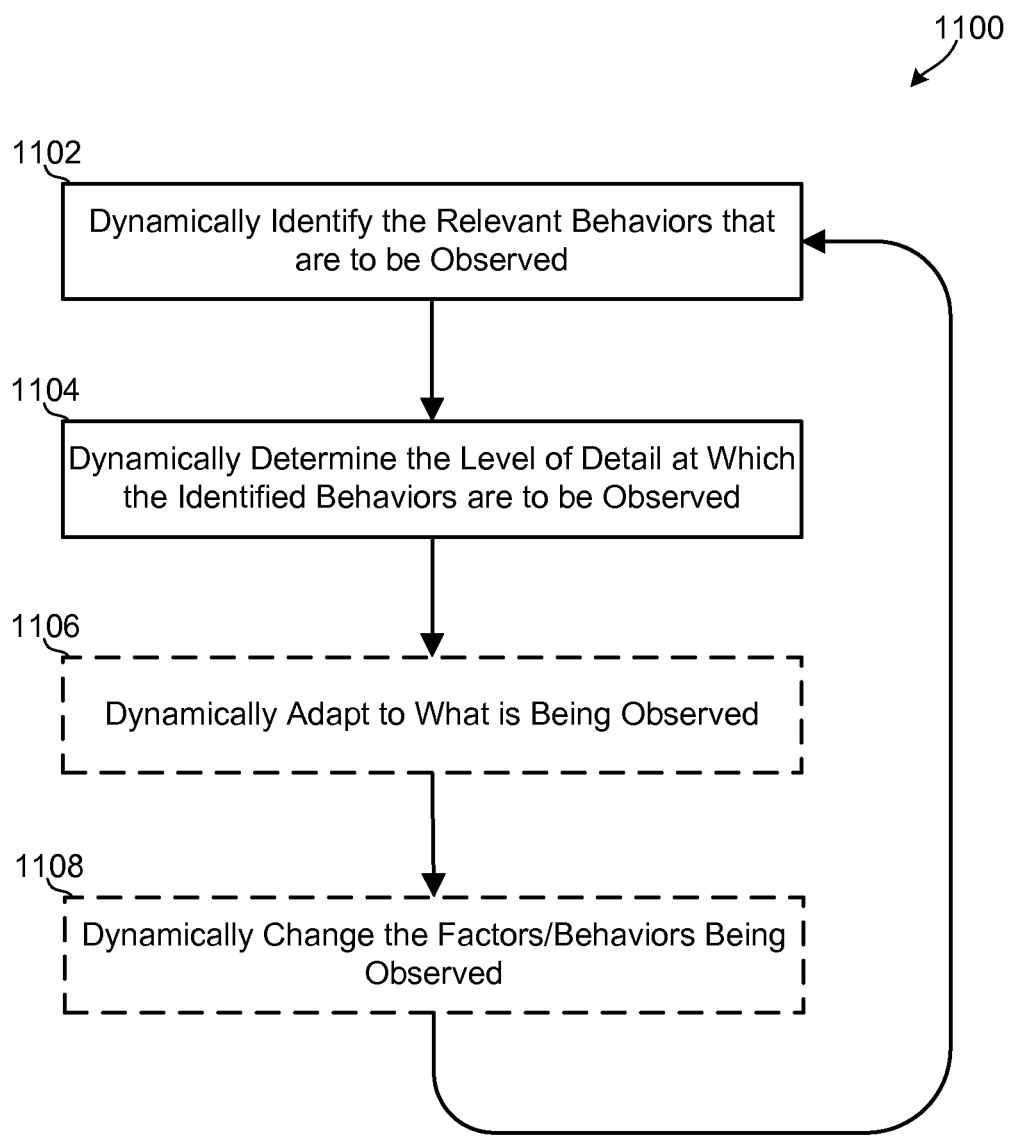
FIG. 11 is a process flow diagram illustrating another aspect method for performing adaptive observations on mobile devices.

FIG. 11 illustrates another example method 1100 for perform dynamic and adaptive observations by a mobile device processor in accordance with another aspect. In block 1102, the mobile device processor may dynamically identify the relevant behaviors that are to be observed on the mobile device. In block 1104, the mobile device processor may dynamically determine the level of detail at which the identified behaviors are to be observed. In optional block 1106, the mobile device processor may dynamically adapt to what is being observed. In optional block 1108, the mobile device processor may dynamically change or update the parameters, factors, behaviors, processes, applications, and/or subsystems that are to be observed. The operations of blocks 1102-1108 may be repeated continuously or as is necessary to improve the mobile device performance (e.g., battery power consumption, processing speed, network communication speeds, etc.).

Figure 12:
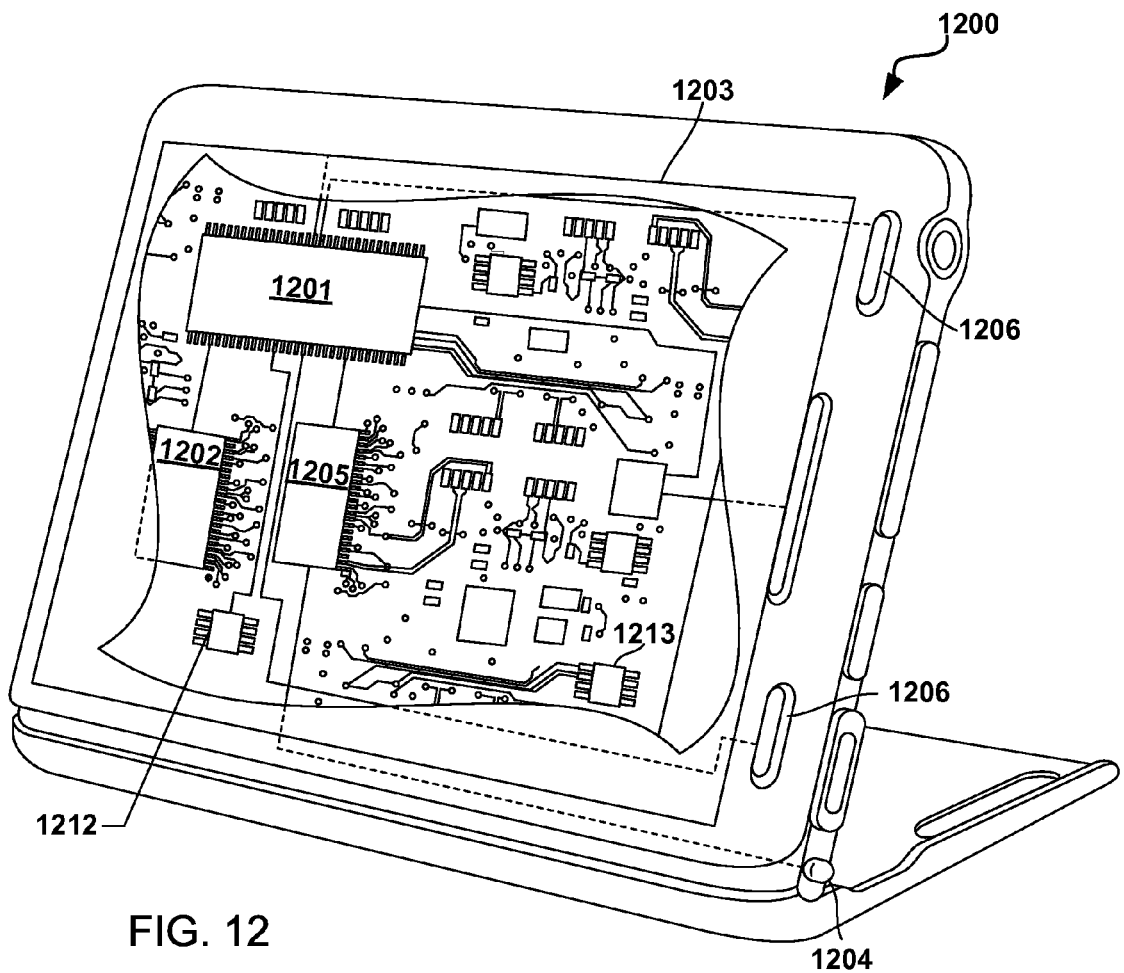
FIG. 12 is a component block diagram of a mobile device suitable for use in an aspect.

The various aspects may be implemented on a variety of mobile computing devices, an example of which is illustrated in FIG. 12 in the form of a smartphone. A smartphone 1200 may include a processor 1201 coupled to internal memory 1202, a display 1203, and to a speaker. Additionally, the smartphone 1200 may include an antenna 1204 for sending and receiving electromagnetic radiation that may be connected to a wireless data link and/or cellular telephone transceiver 1205 coupled to the processor 1201. Smartphone 1200 typically also include menu selection buttons or rocker switches 1206 for receiving user inputs.

A typical smartphone 1200 also includes a sound encoding/decoding (CODEC) circuit 1212, which digitizes sound received from a microphone into data packets suitable for wireless transmission and decodes received sound data packets to generate analog signals that are provided to the speaker to generate sound. Also, one or more of the processor 1201, wireless transceiver 1205 and CODEC 1212 may include a digital signal processor (DSP) circuit (not shown separately).

Figure 13:
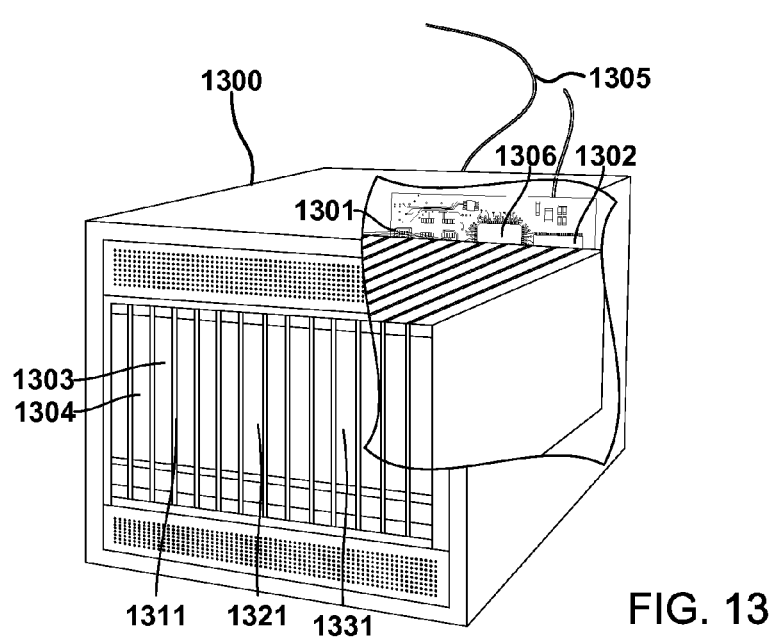
FIG. 13 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 13011 coupled to the processor 1301. The server 1300 may also include network access ports 1304 coupled to the processor 1301 for establishing data connections with a network 1305, such as a local area network coupled to other broadcast system computers and servers.

The processors 1201, 1301 may be any programmable microprocessor, microcomputer or multiple processor chip or chips that can be configured by software instructions (applications) to perform a variety of functions, including the functions of the various aspects described below. In some mobile devices, multiple processors 1201 may be provided, such as one processor dedicated to wireless communication functions and one processor dedicated to running other applications. Typically, software applications may be stored in the internal memory 1202, 1302, 1303 before they are accessed and loaded into the processor 1201, 1301. The processor 1201, 1301 may include internal memory sufficient to store the application software instructions.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for observing mobile device behaviors over a period of time to recognize mobile device behaviors inconsistent with normal operation patterns, the method comprising:
   dynamically determining in a processor of a mobile device mobile device behaviors that are to be observed by:
      observing mobile device behaviors over the period of time; and
      identifying a limited set of behaviors associated with inconsistent operations as the mobile device behaviors to be observed by:

receiving behavior inputs from one or more of a high-level application, a system kernel and a driver application programming interface (API) after filtering by an adaptive filter;
receiving a context input regarding operations of the mobile device;
performing spatial correlations of the received behavior inputs and the received context input; and
generating a behavior vector;
adaptively observing the determined mobile device behaviors to identify a suspicious mobile device behavior from a limited set of observations; and
controlling an observation granularity of the adaptive observation.

2. The method of claim 1, wherein operations of dynamically determining mobile device behaviors that are to be observed and controlling the observation granularity of the adaptive observation are accomplished via an observer daemon operating within the system kernel.

3. The method of claim 1, wherein:
identifying the limited set of behaviors associated with inconsistent operations as the mobile device behaviors to be observed comprises performing temporal correlations of the received behavior inputs and the received context input; and
generating the behavior vector comprises generating the behavior vector based on a result of the spatial and temporal correlations.

4. The method of claim 1, wherein identifying the limited set of behaviors associated with inconsistent operations as the mobile device behaviors to be observed comprises storing the generated behavior vector in a secure memory.

5. A mobile computing device, comprising:
a processor configured with processor-executable instructions to perform operations comprising:
dynamically determining mobile device behaviors that are to be observed by:
observing mobile device behaviors over a period of time; and
identifying a limited set of behaviors associated with inconsistent operations as the mobile device behaviors to be observed by:
receiving behavior inputs from one or more of a high-level application, a system kernel and a driver application programming interface (API) after filtering by an adaptive filter;
receiving a context input regarding operations of the mobile device;
performing spatial correlations of the received behavior inputs and the received context input; and
generating a behavior vector;
adaptively observing the determined mobile device behaviors to identify a suspicious mobile device behavior from a limited set of observations; and
controlling an observation granularity of the adaptive observation.

6. The mobile computing device of claim 5, wherein the processor is configured with processor-executable instructions to perform operations such that the operations of dynamically determining mobile device behaviors that are to be observed and controlling the observation granularity of the adaptive observation are accomplished via an observer daemon operating within the system kernel.

7. The mobile computing device of claim 5, wherein the processor is configured with processor-executable instructions to perform operations such that:

identifying the limited set of behaviors associated with inconsistent operations as the mobile device behaviors to be observed comprises performing temporal correlations of the received behavior inputs and the received context input; and
generating the behavior vector comprises generating the behavior vector based on a result of the spatial and temporal correlations.

8. The mobile computing device of claim 5, wherein the processor is configured with processor-executable instructions to perform operations such that identifying the limited set of behaviors associated with inconsistent operations as the mobile device behaviors to be observed comprises storing the generated behavior vector in a secure memory.

9. A non-transitory computer readable storage medium having stored thereon processor-executable software instructions configured to cause a processor of a mobile device to perform operations comprising:
dynamically determining mobile device behaviors that are to be observed by:
observing mobile device behaviors over a period of time; and
identifying a limited set of behaviors associated with inconsistent operations as the mobile device behaviors to be observed by:
receiving behavior inputs from one or more of a high-level application, a system kernel and a driver application programming interface (API) after filtering by an adaptive filter;
receiving a context input regarding operations of the mobile device;
performing spatial correlations of the received behavior inputs and the received context input; and
generating a behavior vector;
adaptively observing the determined mobile device behaviors to identify a suspicious mobile device behavior from a limited set of observations; and
controlling an observation granularity of the adaptive observation.

10. The non-transitory computer readable storage medium of claim 9, wherein the stored processor-executable software instructions are configured to cause a processor to perform operations such that the operations of dynamically determining mobile device behaviors that are to be observed and controlling the observation granularity of the adaptive observation are accomplished via an observer daemon operating within the system kernel.

11. The non-transitory computer readable storage medium of claim 9, wherein the stored processor-executable software instructions are configured to cause a processor to perform operations such that:
identifying the limited set of behaviors associated with inconsistent operations as the mobile device behaviors to be observed comprises performing temporal correlations of the received behavior inputs and the received context input; and
generating the behavior vector comprises generating the behavior vector based on a result of the spatial and temporal correlations.

12. The non-transitory computer readable storage medium of claim 9, wherein the stored processor-executable software instructions are configured to cause a processor to perform operations such that identifying the limited set of behaviors associated with inconsistent operations as the mobile device behaviors to be observed comprises storing the generated behavior vector in a secure memory.

13. A method of improving performance on a mobile device, comprising:
- performing on a mobile device processor real-time behavior analysis of mobile device behaviors to generate coarse observations;
- identifying suspicious behavior from the coarse observations;
- dynamically determining the mobile device behaviors that require further observation in greater detail by:
  - receiving behavior inputs from one or more of a high-level application, a system kernel and a driver application programming interface (API) after filtering by an adaptive filter;
  - receiving a context input regarding operations of the mobile device;
  - performing spatial correlations of the received behavior inputs and the received context input; and
  - generating a behavior vector;
- dynamically determining a level of detail required for the further observation;
- performing finer observations based on the determined level of detail required for the further observation; and
- identifying suspicious behavior from the finer observations.

14. The method of claim 13, further comprising:
performing mobile devices operations to correct the identified suspicious behavior.

15. The method of claim 13, wherein performing spatial correlations of the received behavior inputs and the received context input comprises performing spatial and temporal correlations of observed mobile device behaviors to detect high-level mobile device behaviors.

16. A mobile computing device, comprising:
a processor configured with processor-executable instructions to perform operations comprising:
- performing real-time behavior analysis of mobile device behaviors to generate coarse observations;
- identifying suspicious behavior from the coarse observations;
- dynamically determining the mobile device behaviors that require further observation in greater detail by:
  - receiving behavior inputs from one or more of a high-level application, a system kernel and a driver application programming interface (API) after filtering by an adaptive filter;
  - receiving a context input regarding operations of the mobile computing device;
  - performing spatial correlations of the received behavior inputs and the received context input; and
  - generating a behavior vector;
- dynamically determining a level of detail required for the further observation;
- performing finer observations based on the determined level of detail required for the further observation; and
- identifying suspicious behavior from the finer observations.

17. The mobile computing device of claim 16, wherein the processor is configured with processor-executable instructions to perform operations further comprising:
performing mobile devices operations to correct the identified suspicious behavior.

18. The mobile computing device of claim 16, wherein the processor is configured with processor-executable instructions to perform operations such that performing spatial correlations of the received behavior inputs and the received context input comprises performing spatial and temporal correlations of observed mobile device behaviors to detect high-level mobile device behaviors.

19. A non-transitory computer readable storage medium having stored thereon processor-executable software instructions configured to cause a processor of a mobile device to perform operations comprising:
- performing real-time behavior analysis of mobile device behaviors to generate coarse observations;
- identifying suspicious behavior from the coarse observations;
- dynamically determining the mobile device behaviors that require further observation in greater detail by:
  - receiving behavior inputs from one or more of a high-level application, a system kernel and a driver application programming interface (API) after filtering by an adaptive filter;
  - receiving a context input regarding operations of the mobile device;
  - performing spatial correlations of the received behavior inputs and the received context input; and
  - generating a behavior vector;
- dynamically determining a level of detail required for the further observation;
- performing finer observations based on the determined level of detail required for the further observation; and
- identifying suspicious behavior from the finer observations.

20. The non-transitory computer readable storage medium of claim 19, wherein the stored processor-executable software instructions are configured to cause a processor to perform operations comprising:
performing mobile devices operations to correct the identified suspicious behavior.

21. The non-transitory computer readable storage medium of claim 19, wherein the stored processor-executable software instructions are configured to cause a processor to perform operations such that performing spatial correlations of the received behavior inputs and the received context input comprises performing spatial and temporal correlations of observed mobile device behaviors to detect high-level mobile device behaviors.

* * * * *